US012797762B2

(12) United States Patent
Cai

(10) Patent No.: US 12,797,762 B2
(45) Date of Patent: *Nov. 17, 2026

(54) ASSEMBLY ROBOT TOY

(71) Applicant: Zeluan Cai, Shenzhen (CN)

(72) Inventor: Zeluan Cai, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/778,261

(22) Filed: Jul. 19, 2024

(65) Prior Publication Data

US 2025/0058238 A1 Feb. 20, 2025

(30) Foreign Application Priority Data

Aug. 18, 2023 (CN) ........................ 202311047616.X
Jul. 3, 2024 (CN) ........................ 202421570282.4

(51) Int. Cl.
*A63H 17/26* (2006.01)
*A63H 29/20* (2006.01)
*B25J 11/00* (2006.01)

(52) U.S. Cl.
CPC ............. *A63H 17/26* (2013.01); *A63H 29/20* (2013.01); *B25J 11/0015* (2013.01)

(58) Field of Classification Search
CPC ............................. B25J 11/0015; A63H 17/26
See application file for complete search history.

(56) References Cited

U.S. PATENT DOCUMENTS 4,199,894 A * 4/1980 Fischer ................ A63H 33/042 136/251
4,310,987 A * 1/1982 Chieffo ................. A63H 29/22 446/175
4,333,262 A * 6/1982 Kimura .................. A63H 29/22 310/40 MM
4,575,354 A * 3/1986 Wakayama .......... A63H 17/004 180/7.1
5,145,442 A * 9/1992 Zan ........................ A63H 29/22 446/163

(Continued)

FOREIGN PATENT DOCUMENTS

CN 201799107 U * 4/2011 ............. A63H 11/00
CN 202342848 U * 7/2012

(Continued)

OTHER PUBLICATIONS

Translation CN201799107U (Year: 2011).*
Translation KR-20120126293-A (Year: 2012).*

*Primary Examiner* — Eugene L Kim
*Assistant Examiner* — Alyssa M Hylinski

(57) ABSTRACT

An assembly robot toy includes a power supply module, a gear box, a rod piece, and a head part and an assembly component which are detachably arranged on the gear box. The gear box includes a motor, a first gear and a transmission gear set. The power supply module is electrically connected with the motor and is used for supplying power to the motor. The first gear is arranged on a rotating shaft of the motor. The transmission gear set includes a second gear meshed with the first gear, the number of teeth of the first gear is less than that of teeth of the second gear. The rod piece is connected with the second gear. The assembly component is connected with the transmission gear set and/or the rod piece. The rod piece and the transmission gear set are used for power output.

17 Claims, 29 Drawing Sheets

(56) References Cited

U.S. PATENT DOCUMENTS

| | | | | |
|---|---|---|---|---|
| 6,605,914 | B2 * | 8/2003 | Yim | A63H 33/042 901/23 |
| 7,013,750 | B1 * | 3/2006 | Kazami | B25J 17/025 901/29 |
| 7,905,760 | B2 * | 3/2011 | Yoneda | B25J 9/1615 446/353 |
| 8,956,198 | B1 * | 2/2015 | Chang | A63H 11/18 446/433 |
| 9,592,603 | B2 * | 3/2017 | Hardouin | B25J 13/003 |
| 9,975,238 | B2 * | 5/2018 | Fei | B25J 9/08 |
| 11,279,043 | B2 * | 3/2022 | Zhang | B25J 11/008 |
| 11,944,918 | B1 * | 4/2024 | Cai | A63H 17/26 |
| 12,303,799 | B2 * | 5/2025 | Cai | A63H 29/22 |
| 2002/0081937 | A1 * | 6/2002 | Yamada | A63H 11/00 446/175 |
| 2015/0321348 | A1 * | 11/2015 | Rollinson | B25J 9/065 901/23 |
| 2016/0158942 | A1 * | 6/2016 | Augenbraun | B25J 11/0085 901/10 |
| 2017/0221383 | A1 * | 8/2017 | Karol | A63H 17/002 |
| 2018/0370025 | A1 * | 12/2018 | Didey | B25J 9/102 |
| 2022/0047961 | A1 * | 2/2022 | Yin | A63H 30/04 |

FOREIGN PATENT DOCUMENTS

| | | | | | |
|---|---|---|---|---|---|
| DE | 202004008075 | U1 | * | 8/2004 | H01M 50/213 |
| EP | 0124237 | A1 | * | 11/1984 | A63H 33/042 |
| JP | H06335570 | A | * | 12/1994 | |
| JP | 2004209250 | A | * | 7/2004 | A63H 9/00 |
| KR | 20120126293 | A | * | 11/2012 | A63H 11/18 |

* cited by examiner

ASSEMBLY ROBOT TOY

CROSS-REFERENCE TO RELATED APPLICATIONS

The application claims priority of Chinese patent application CN202311047616X, filed on Aug. 18, 2023, and CN2024215702824, filed Jul. 3, 2024, which is incorporated herein by reference in its entireties.

TECHNICAL FIELD

The present disclosure relates to the technical field of assembly toys, in particular to an assembly robot toy.

BACKGROUND

As everyone knows, the assembly toy is a toy with a certain shape by using parts with various shapes. However, at present, existing assembled electric toys can only be assembled into one shape which is driven, are extremely limited, and cannot stimulate the creativity of children well. In addition, the power output of an existing driving mechanism generally refers to a power output end through one or more rotating rods, so that the power transmission of the assembled electric toy starts from two sides, resulting in the limitation of assembly.

SUMMARY

The main purpose of the present disclosure is to provide an assembly robot toy so as to solve the problem that an assembled electric toy is limited because power of a driving mechanism of an existing assembled electric toy is output from two ends.

In order to solve the technical problem, the technical scheme provided by the present disclosure is as follows.

An assembly robot toy, includes a power supply module, a gear box, a rod piece, and a head part and an assembly component which are detachably arranged on the gear box, wherein the gear box includes a motor, a first gear and a transmission gear set, the power supply module is electrically connected with the motor and is used for supplying power to the motor, the first gear is arranged on a rotating shaft of the motor, the transmission gear set includes a second gear meshed with the first gear, the number of teeth of the first gear is less than that of teeth of the second gear, the rod piece is connected with the second gear, and the assembly component is connected with the transmission gear set and/or the rod piece;

the rod piece is configured to rotate through the transmission of the first gear and the transmission gear set during motor driving, and at least part of the assembly component is configured to move and drive the gear box and the head part to move when the transmission gear set and/or the rod piece rotate/rotates.

In one embodiment, the rod piece includes a first rotating rod and a second rotating rod, and the second gear is arranged on the first rotating rod;

the transmission gear set includes a third gear arranged on the first rotating rod, a fourth gear and a fifth gear arranged on the second rotating rod, and a sixth gear meshed with the fifth gear; the sixth gear is arranged on the first rotating rod, the fifth gear is connected with the fourth gear, the third gear is meshed with the fourth gear, the fifth gear is meshed with the sixth gear, the sixth gear is meshed with the fifth gear, the sixth gear is connected with the fifth gear, the number of teeth of the third gear is less than that of teeth of the fourth gear, the number of teeth of the fifth gear is less than that of teeth of the sixth gear, the first rotating rod is connected with the assembly component;

the first rotating rod rotates through the transmission of the first gear and the second gear during motor driving, the third gear is driven to rotate when the first rotating rod rotates, the fourth gear is driven to rotate when the third gear rotates, the fifth gear is driven to rotate when the fourth gear rotates, the sixth gear is driven to rotate when the fifth gear rotates, the first rotating rod is driven to rotate when the fifth gear rotates, the assembly component is configured to move when the first rotating rod or the sixth gear rotates.

In one embodiment, the transmission gear set also includes a seventh gear and an eighth gear, the seventh gear and the eighth gear are arranged on the first rotating rod, the seventh gear is a spur gear, the eighth gear is a spur gear, first avoidance holes are formed in the gear box at the positions corresponding to the seventh gear and the eighth gear, the diameter of the seventh gear is larger than that of the eighth gear, the seventh gear and the eighth gear are driven to rotate when the first rotating rod rotates, and the assembly component is connected with one or more of the first rotating rod, the seventh gear and the eighth gear.

In one embodiment, the rod piece also includes a plurality of transmission rods connected to the assembly component, at least two transmission rods are arranged at both ends of the first rotating rod, the transmission rod connected to the first rotating rod at least partially extends into the gear box, and a second avoidance hole is formed in the gear box at the position corresponding to the transmission rod.

In one embodiment, the gear box includes a first shell and a second shell which is detachably connected with the first shell to form a first mounting cavity, a second mounting cavity and a second avoidance hole; and the motor is mounted in the first mounting cavity, the gear set is mounted in the second mounting cavity, and a wiring hole connected with the first mounting cavity is formed in the first shell and/or the second shell.

In one embodiment, a rotating hole is formed in the second mounting cavity;

the gear set also includes a second rotating rod with one end arranged in the rotating hole after passing through the fourth gear and the fifth gear, and a limit cap arranged at the other end of the second rotating rod; and the seventh gear is located between the fourth gear and the limit cap.

In one embodiment, the first shell protrudes on one side opposite to the second shell to form a plurality of first plugging ends, a plurality of first plugging grooves are formed in one side, opposite to the first shell, of the second shell, and the first plugging end is arranged in the first plugging groove; and the gear box also includes a plurality of reinforcing cover plates, a plurality of first clamping holes are formed in the reinforcing cover plate, and a plurality of first clamping buckles are arranged on both sides of the first shell and the second shell, and the first clamping buckle is clamped with the first clamping hole.

In one embodiment, the head part is rotatably connected with the gear box, and the head part is located at one of the top, front and back positions of the gear box.

In one embodiment, a first connecting rod and a second connecting rod are arranged between the head part and the gear box, and the first connecting rod is rotatably connected with the second connecting rod; and the first connecting rod is configured to drive the head part to rotate along a central axis of the first connecting rod under the action of external force, and the second connecting rod is configured to drive the head part to rotate along a direction perpendicular to the central axis of the first connecting rod under the action of external force.

In one embodiment, the power supply module is arranged on the head part; the power supply module is a solar panel.

In one embodiment, the head part includes a bottom shell, a face shell which is detachably connected with the bottom shell and forms a third mounting cavity and two fourth mounting cavities with the bottom shell, a solar panel arranged in the third mounting cavity and two conducting springs respectively arranged in the two fourth mounting cavities and welded to the solar panel; and the solar panel is arranged in the third mounting cavity, the two fourth mounting cavities are arranged at intervals and are both connected with the third mounting cavity, a third avoidance hole is formed in the face shell and/or the bottom shell at the position corresponding to the fourth mounting cavity, a display port is formed in the face shell at the position corresponding to the solar panel, the motor is electrically connected with two conducting wires, the tail end of the conducting wire is provided with a conducting plate, and the conducting plate is plugged in the conducting spring.

In one embodiment, the bottom of one end of the face shell extends downward to form a second plugging end, the bottom of the other end of the face shell extends downward to form a plurality of first stop blocks arranged at intervals, and the first stop block protrudes at the bottom of one side opposite to the second plugging end to form a second stop block;

a second plugging groove with a length larger than the length of the second plugging end is formed in the bottom shell, a front end of the bottom shell is arranged above the second stop block, and the second plugging end is arranged in the second plugging groove; and the head part also includes a plurality of cover bodies with accommodating grooves, the bottom shell is connected with the face shell to form first joint ends on both sides of the head part, and the first joint ends are arranged in the accommodating grooves.

In one embodiment, the assembly component includes a plurality of bolts, fixed plates, connecting plates, third rotating rods, wheels, straight-line connecting rods, symmetrical semicircular sole pieces, U-shaped pieces, force arm connecting rods, arc-shaped connecting rods, T-shaped connecting rods, first cams, second cams, fluctuating gears, accessory spur gear and fixed rods;

any two of the gear box, the fixed plate, the connecting plate, the straight-line connecting rod, the arc-shaped connecting rod, the T-shaped connecting rod, the U-shaped piece, the force arm connecting rod, the symmetrical semicircular piece, the first cam, the second cam and the wheel are both connected through one of the bolt and the fixed rod, the accessory spur gear can be used for being meshed with the transmission gear set, the accessory spur gear, the wheel, the first cam, the second cam, the fluctuating gear and the wheel can detachably sleeve the third rotating rod or the fixed rod, and the second cam is detachably plugged in the transmission rod.

In one embodiment, a first sliding hole and a second sliding hole perpendicular to the first sliding hole are formed in the T-shaped connecting rod, and the fluctuating gear is provided with a plurality of arc-shaped teeth arranged around the fluctuating gear; the symmetrical semicircular piece is formed by connecting two semicircular plates in central symmetry, a side wall of the second cam is surrounded by first gear teeth, and the inner side of the arc-shaped connecting rod is provided with second gear teeth meshed with the second cam.

In one embodiment, at least one plane is formed on an outer side wall of the third rotating rod.

In one embodiment, a plurality of annular clamping grooves are formed in the outer side walls of the fixed rod and the third rotating rod at equal intervals, the assembly component also includes a plurality of fixed sleeves sleeving the fixed rod or the third rotating rod, at least one U-shaped opening is formed in a side wall of the fixed sleeve, and one end of an inner side wall of the fixed sleeve protrudes inward to form a second clamping block matched with the annular clamping groove.

The position of the accessory spur gear on the third rotating rod or the fixed rod is limited by two fixed sleeves respectively sleeving both sides of the accessory spur gear.

In one embodiment, the cross section of the outer side wall of the third rotating rod is a hexagon, the cross section of an outer side wall of the fixed rod is circular, and the diameter of the fixed rod is equal to the distance between two opposite sides of the hexagon.

In one embodiment, the shape of the assembly robot toy is a crawling robot.

When the assembly robot toy is a crawling robot, the head part is arranged on the top of the gear box; the number of the fixed plates is two, and the two fixed plates are respectively detachably arranged on the left and right sides of the gear box through bolts; the number of the connecting rods is four, and the four connecting rods are respectively arranged at the front and rear ends of the two fixed plates; the numbers of the first cams and the force arm connecting rods are two, the number of the third rotating rods is two, the number of the fixed rods is at least two, the number of the wheels is four, the number of the arc-shaped connecting rods is eight, both ends of one third rotating rod are connected with the first cam after respectively passing through the front ends of two opposite fixed plates, and both ends of one fixed rod are respectively connected with the rear ends of the two opposite fixed plates; one end of each of every two arc-shaped connecting rods is rotatably connected through a bolt to form a similarly semicircular connecting rod, three-quarters and one-quarter positions of every two similarly semicircular connecting rods are connected through a bolt to form a crawling component, and the opening directions of the two similarly semicircular connecting rods in the crawling component are opposite; both ends of each force arm connecting rod are respectively connected with the first cam and one end of the crawling component through bolts, and both ends of one third rotating rod are connected with the wheels after respectively passing through the other end of the crawling component; the two wheels are respectively connected with the front ends of two opposite connecting plates at the front end of the fixed plate through bolts; the number of the accessory spur gears is at least two, one accessory spur gear sleeves the third rotating rod with the first cam, and the other accessory spur gear sleeves the fixed rod adjacent to one accessory spur gear and is respectively meshed with the transmission gear set and the accessory spur gear located on the fixed rod.

In one embodiment, the assembly component also includes a hull, two first lugs arranged at intervals are formed on the hull, and a fourth assembly hole is formed in the first lug; the number of the fixed plates is two, and the two fixed plates are respectively fixed on the front and rear side walls of the gear box; and the first lug is connected to the fixed plate after passing through the fourth assembly hole through a bolt.

In one embodiment, the hull includes a foldable plastic sheet, a first plug connector and a cap body with a third plugging groove, and the first lug is foldably connected to the hull; the plastic sheet includes two connected first sheets, and the first lug is located at the position where the two first sheets are connected; both ends of the first sheet are provided with two second lugs at intervals, a fifth assembly hole is formed in the second lug, and the first plug connector is arranged in the third plugging groove after passing through the fourth assembly holes in the two lugs at one end of the first sheet.

In one embodiment, the assembly robot toy is a surfing robot, and the head part is arranged on the front side wall of the gear box; the numbers of the second cams, the fixed rods, the straight-line connecting rods and the force arm connecting rods are all two, the two second cams are respectively plugged on two transmission rods, the two fixed rods are respectively plugged at non-central positions of two second cams, and the two straight-line connecting rods respectively sleeve two fixed rods; the numbers of the arc-shaped connecting rods and the T-shaped connecting rods are four, both ends of every two arc-shaped connecting rods are connected to form a wave-shaped leg part, and one end of each of the two leg parts is respectively connected to two straight-line connecting rods through bolts; every two T-shaped connecting rods are oppositely arranged side by side through bolts to form a sole piece, and the first sliding hole and the second sliding hole on each T-shaped piece are splayed; both ends of each force arm connecting rod are respectively connected to the other end of the leg part and one end of the sole piece through bolts, and the middle position of each force arm connecting rod is rotatably connected to the first plug connector through bolts; the number of the symmetrical semicircular pieces is six, and every three symmetrical semicircular pieces are matched with the bolts to form a paddling arm; in each paddling arm, one end of each of the three symmetrical semicircular pieces is connected through bolts, the other end of the symmetrical semicircular piece in the middle is arranged on one fixed rod through a bolt, and the central positions of the other two symmetrical semicircular pieces are connected through bolts and away from one side of the fixed plate.

The present disclosure has the beneficial effects: the detachable head part and the detachable assembly component are configured on the gear box, wherein the head part serves as a head of a robot, and the assembly component is a part of a toy outline. The rod piece and the transmission gear set are used for power output. Thus, the assembly component is assembled by a user according to the output position of required power. The problem that conventional assembled electric toys are limited since generally both-end or symmetrical power output is of assembly diversity is solved, the assembly diversity of the assembly robot toy in the embodiment is improved, the imagination and creativity of child assembly are simulated, and the interestingness of the toy is increased.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

Referring to FIG. 1 to FIG. 50, an assembly robot toy is disclosed in the embodiment of the present disclosure.

Figure 1:
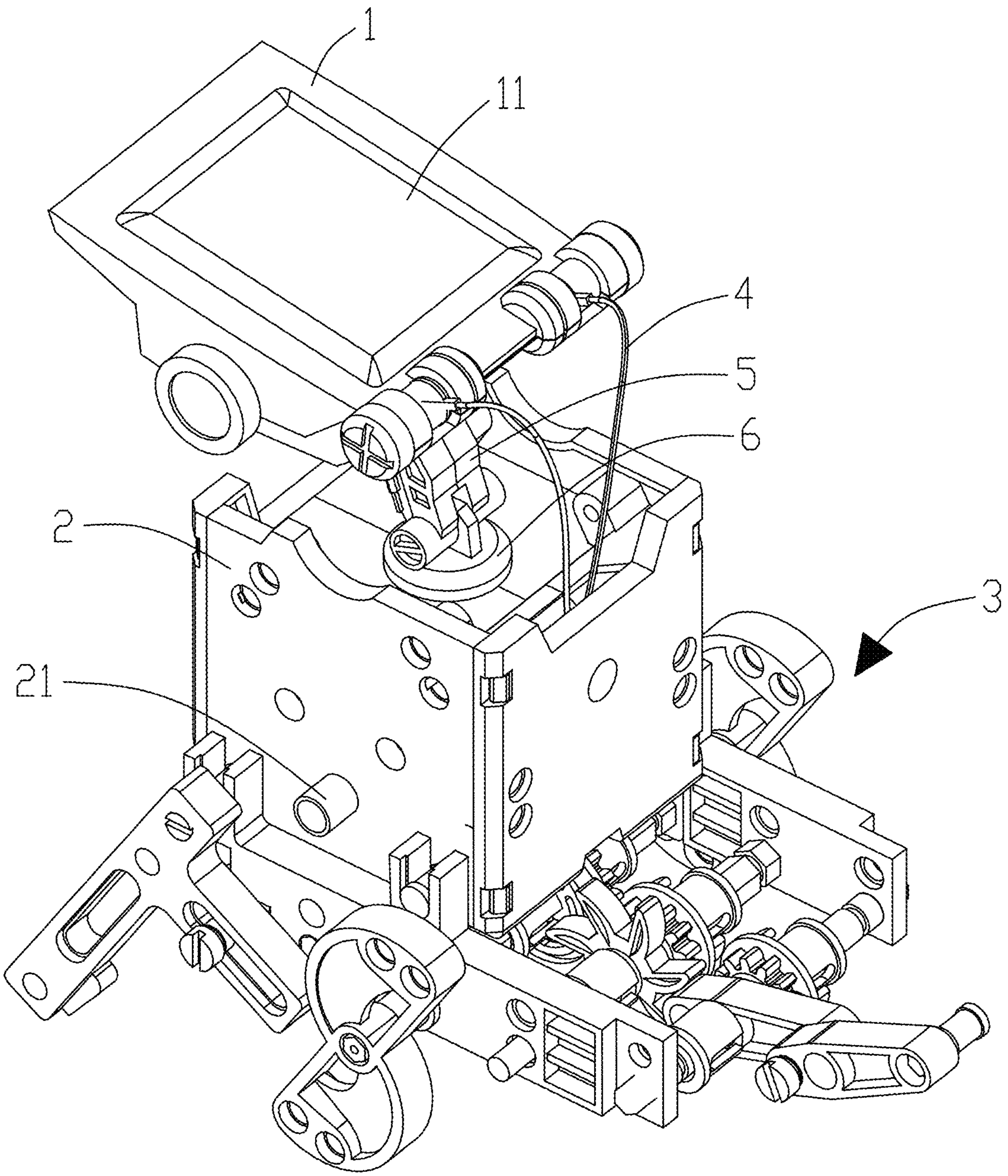
FIG. 1 is a space diagram of the present disclosure.
Figure 2:
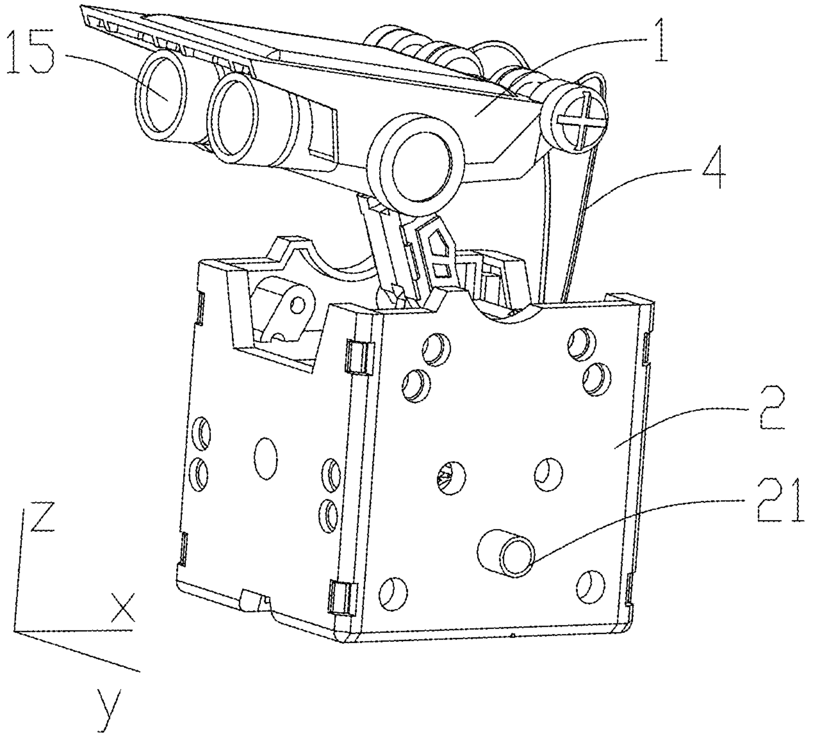
FIG. 2 is a schematic diagram of a head part located on the top of a gear box in the present disclosure.
Figure 3:
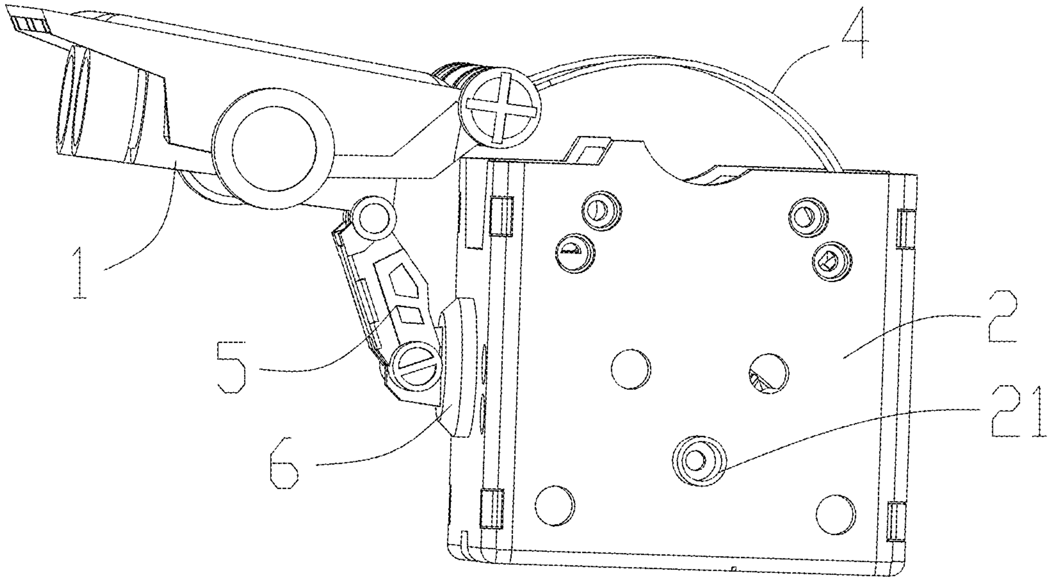
FIG. 3 is a schematic diagram of a head part located at a front end of a gear box in the present disclosure.
Figure 9:
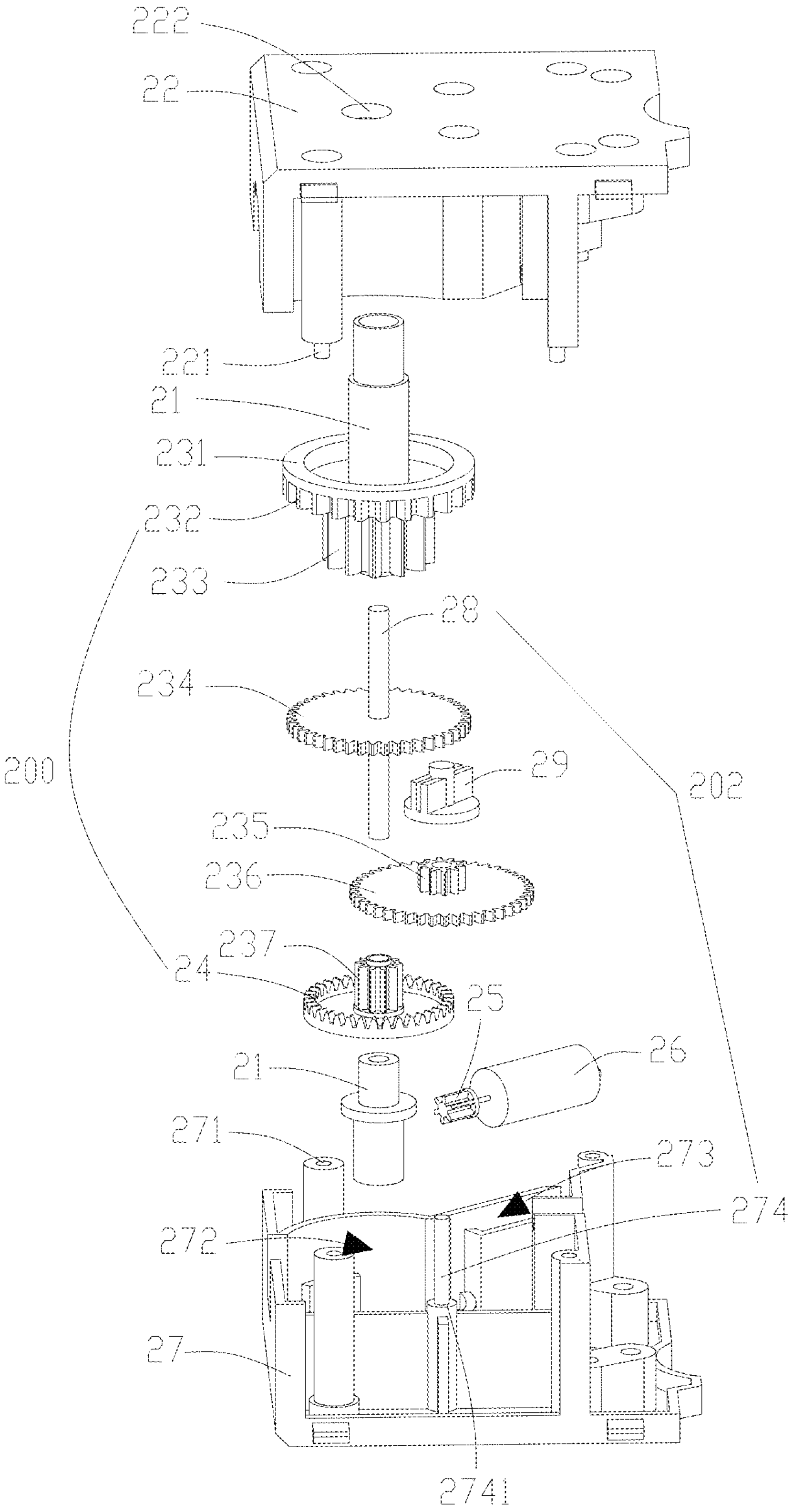
FIG. 9 is an explosive view of a gear box without a reinforcing cover plate in the present disclosure.
Figure 10:
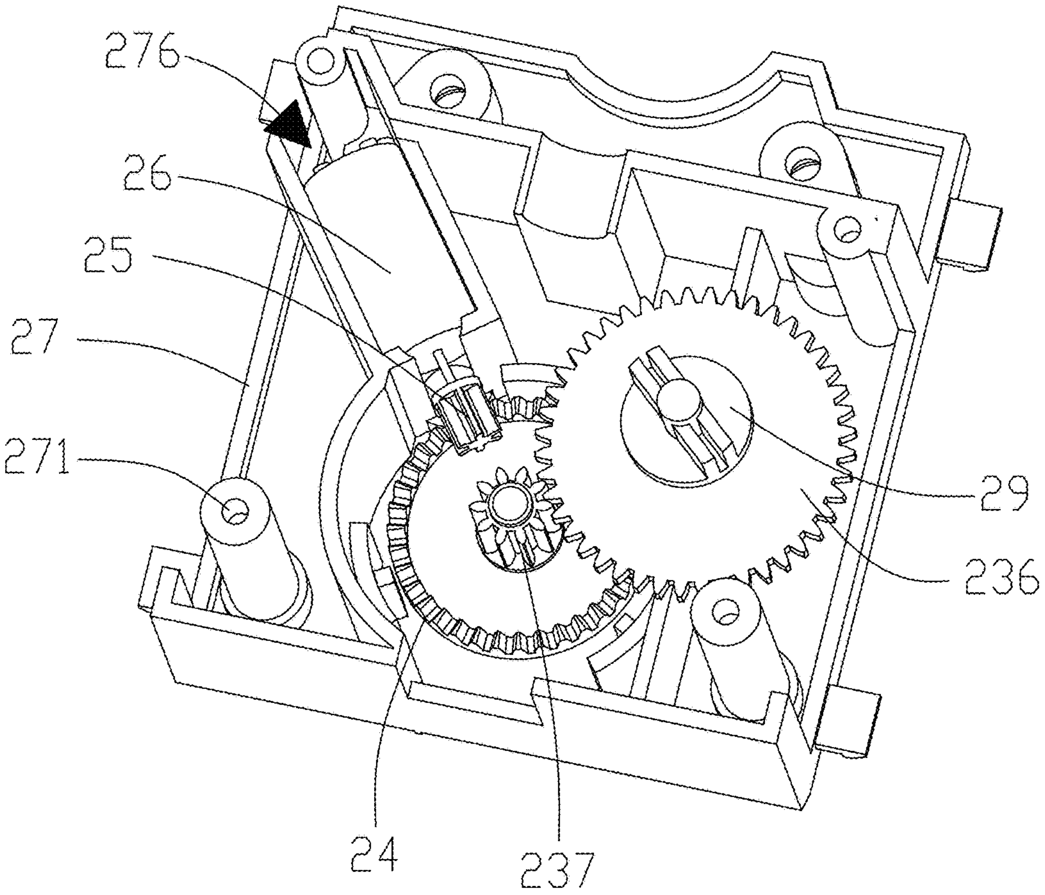
FIG. 10 is an assembly diagram of a motor and part of a gear set mounted on a second shell in the present disclosure.
Figure 11:
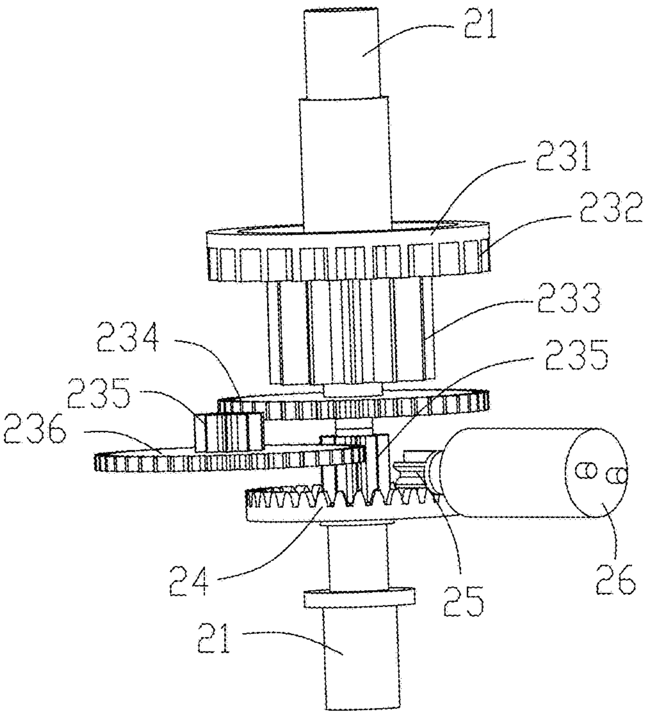
FIG. 11 is an assembly diagram of a gear box without a first shell or a second shell in the present disclosure.
Figure 12:
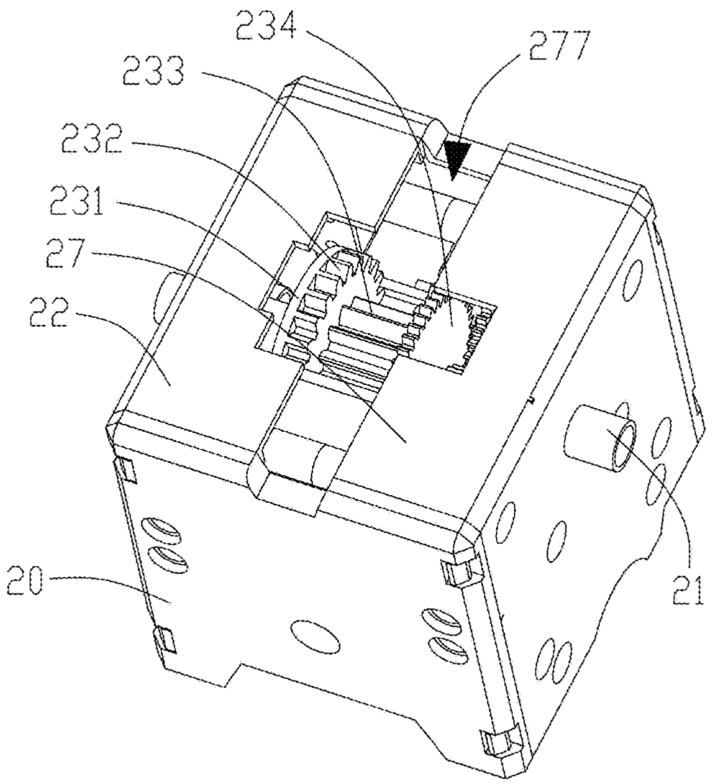
FIG. 12 is a schematic diagram of a gear box in the present disclosure.

Referring to FIG. 1 and FIG. 9, the assembly robot toy includes a power supply module 11, a gear box 2, a rod piece 202, and a head part 1 and an assembly component 3 which are detachably arranged on the gear box 2. The gear box 2 includes a motor 26, a first gear 25 and a transmission gear set 200. The power supply module 11 is electrically connected with the motor 26 and is used for supplying power to the motor 26. The first gear 25 is arranged on a rotating shaft of the motor 26. The transmission gear set 200 includes a second gear 24 meshed with the first gear 25. The number of teeth of the first gear 25 is less than that of teeth of the second gear 24. The rod piece 202 is connected with the second gear 24. The assembly component 3 is connected with the transmission gear set 200 and/or the rod piece 202. The rod piece 202 is configured to rotate through the transmission of the first gear 25 and the transmission gear set 200 when the motor 26 is driven. At least part of the assembly component 3 is configured to move and drive the gear box 2 and the head part 1 to move when the transmission gear set 200 and/or the rod piece 202 rotate/rotates.

In the embodiment, the detachable head part 1 and the detachable assembly component 3 are configured on the gear box 2, wherein the head part 1 serves as a head of a robot, and the assembly component 3 is a part of a toy outline. The rod piece 202 and the transmission gear set 200 are used for power output. Thus, the assembly component 3 is assembled by a user according to the output position of required power. The problem that conventional assembled electric toys are limited since generally both-end or symmetrical power output is of assembly diversity is solved, the assembly diversity of the assembly robot toy in the embodiment is improved, the imagination and creativity of child assembly are simulated, and the interestingness of the toy is increased.

Specifically, the number of teeth of the first gear 25 is less than that of teeth of the second gear 24, so that the rotational speed of the rod piece 202 is less than the rotational speed of the motor 26 so as to control the movement speed of the assembly component 3.

Referring to FIG. 8 to FIG. 11, in one embodiment, the rod piece 202 includes a first rotating rod 28 and a second rotating rod 274, and the second gear 24 is arranged on the first rotating rod 28. The transmission gear set 200 includes a third gear 237 arranged on the first rotating rod 28, a fourth gear 236 and a fifth gear 235 arranged on the second rotating rod 274, and a sixth gear 234 meshed with the fifth gear 235. The sixth gear 234 is arranged on the first rotating rod 28. The fifth gear 235 is connected with the fourth gear 236. The third gear 237 is meshed with the fourth gear 236. The fifth gear 235 is meshed with the sixth gear 234. The number of teeth of the third gear 237 is less than that of teeth of the fourth gear 236. The first rotating rod 28 rotates through the transmission of the first gear 25 and the second gear 24 when the motor 26 is driven. The third gear 237 is driven to rotate when the first rotating rod 28 rotates. The fourth gear 236 is driven to rotate when the third gear 237 rotates. The fifth gear 235 is driven to rotate when the fourth gear 236 rotates. The sixth gear 234 is driven to rotate when the fifth gear 235 rotates. The second rotating rod 274 is driven to rotate when the fifth gear 235 rotates. The assembly component 3 is configured to move when the first rotating rod 28 or the sixth gear 234 rotates so as to output the power output by the motor 26 to the assembly component 3 from the first rotating rod 28 or the sixth gear 234. The number of teeth of the fifth gear 235 is less than that of teeth of the sixth gear 234, and the first rotating rod 28 is connected with the assembly component 3 so as to further decelerate the rotational speed output by the motor 26.

In one embodiment, the transmission gear set 200 also includes a seventh gear 233 and an eighth gear 232. The seventh gear 233 and the eighth gear 232 are arranged on the first rotating rod 28. The seventh gear 233 is a spur gear. The eighth gear 232 is a spur gear. First avoidance holes 217 are formed in the gear box 2 at the positions corresponding to the seventh gear 233 and the eighth gear 232. The seventh gear 233 and the eighth gear 232 are driven to rotate when the first rotating rod 28 rotates. The assembly component 3 is connected with one or more of the first rotating rod 28, the seventh gear 233 and the eighth gear 232. By using the first avoidance holes 217, the seventh gear 233 and the eighth gear 232 are respectively connected with the assembly component 3, and the power of the motor 26 is output. The diameter of the seventh gear 233 is smaller than that of the eighth gear 232, so that the user can assemble different shapes according to the assembly component 3.

In one embodiment, the rod piece 202 also includes a plurality of transmission rods 21 connected to the assembly component 3. At least two transmission rods 21 are arranged at both ends of the first rotating rod 28. The transmission rod 21 connected to the first rotating rod 28 at least partially extends into the gear box 2. A second avoidance hole 222 is formed in the gear box 2 at the position corresponding to the transmission rod 21. By using the transmission rods 21 located at both ends of the first rotating rod 28, the power of the motor is output from both sides of the gear box 2. Specifically, in the embodiment, the second avoidance hole 222 and the first avoidance hole 217 are respectively formed in two different side surfaces of the gear box 2.

In other embodiments, the first rotating rod 28 is also divided into two disconnected rod bodies. Namely, the second gear 24 and the third gear 237 are located on the same rod body, and the fourth gear 236 and the fifth gear 235 are located on the other rod body. Herein, whether the second gear 24, the third gear 237, the fourth gear 236 and the fifth gear 235 are located on the same rod body is not defined. However, in the embodiment, in order to facilitate the assembly and production of the product, the first rotating rod 28 is in a continuous rod shape, and the second gear 24, the third gear 237, the fourth gear 236 and the fifth gear 235 are all located on the first rotating rod 28.

In one embodiment, the gear box 2 includes a first shell 22 and a second shell 27, and the second shell 27 is detachably connected with the first shell 22 to form a first mounting cavity 273, a second mounting cavity 272 and a second avoidance hole 277. The motor 26 is mounted in the first mounting cavity 273. The gear set 200 is mounted in the second mounting cavity 272. A wiring hole 276 connected with first mounting cavity 273 is formed in the first shell 22 and/or the second shell 27. The first shell 22 and the second shell 27 are detachable, so that the gear set 200, the motor 26 and the transmission rod 21 can be mounted in the first shell 22 and the second shell 27 so as to complete the assembly of the whole gear box 2. A user can understand the mechanical principle of how to drive the gear set 200 and the transmission rod 21 after the motor 26 is driven, thus expanding the cognition. Moreover, the arrangement of the wiring hole 276 can facilitate the wiring of a wire, electrically connected with the motor 26, of the power supply module 11 in the head part 1, so that the motor 26 is electrically connected with the power supply module 11.

In the above embodiment, a rotating hole 2741 is formed in the second mounting cavity 272. The gear set 200 also includes a second rotating rod 274 with one end arranged in the rotating hole 2741 after passing through the fourth gear 236 and the fifth gear 235, and a limit cap 29 arranged at the other end of the second rotating rod 274. The seventh gear 233 is located between the fourth gear 236 and the limit cap 29, so that when the assembly robot toy in the embodiment is assembled, one end of the second rotating rod 274 can be arranged in the rotating hole 2741 and the motor 26 can be arranged in the first mounting cavity 273. Then, the independent transmission rod 21 is arranged in the second avoidance hole 222. Then, one end of the first rotating rod 28 is plugged in the middle of the transmission rod 21. Then, sequentially, the first injection molded part sleeves the first rotating rod 28, the third injection molded part sleeves the second rotating rod 274, the sixth gear 234 sleeves the first rotating rod 28, the limit cap 29 is plugged at one end, away from the rotating hole 2741, of the second rotating rod 274, and the second injection molded part sleeves the first rotating rod 28. By using mutual limitation of the second gear 24, the fourth gear 236, the sixth gear 234 and the limit cap 29, the second rotating rod 274 can be limited in the rotating hole 2741 to cooperate with the connection of the first shell 22 and the second shell 27. The whole gear set 200 and the motor 26 are completely limited after the two transmission rods 21 pass through the second avoidance hole 277, so that the gear box 2 is completely mounted.

Figure 13:
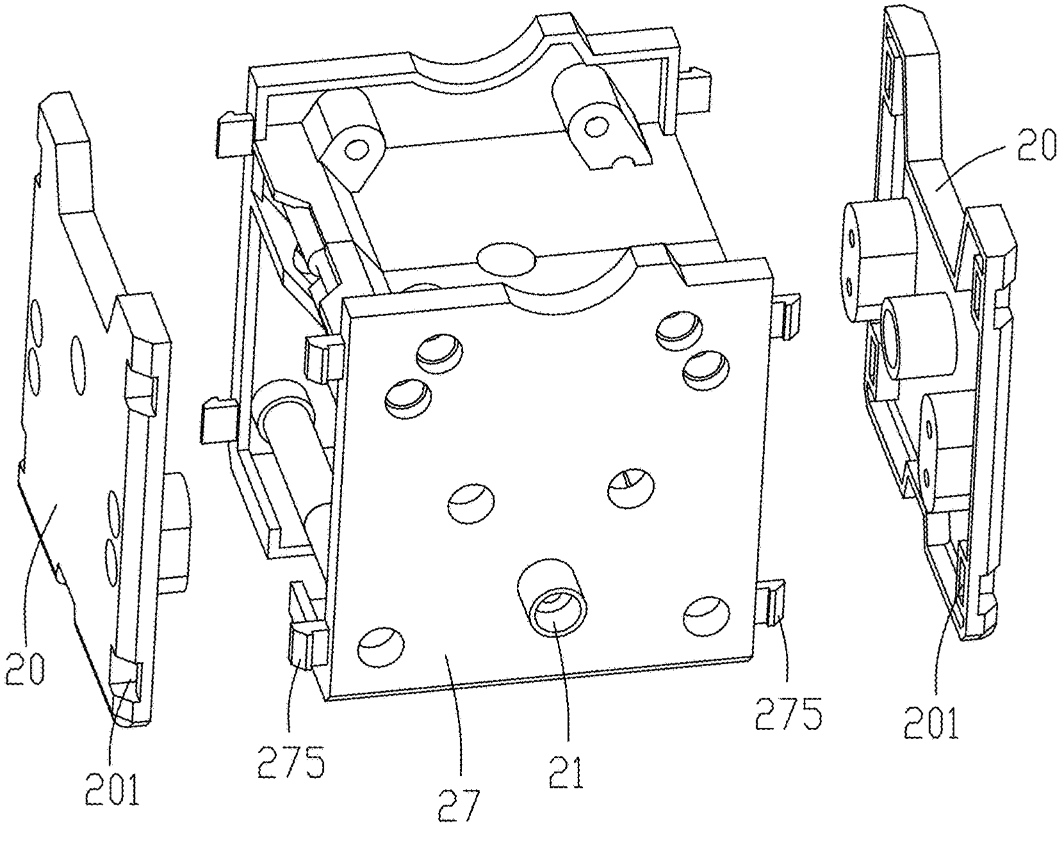
FIG. 13 is an exploded view of a part with a gear box in the present disclosure.
Figure 14:
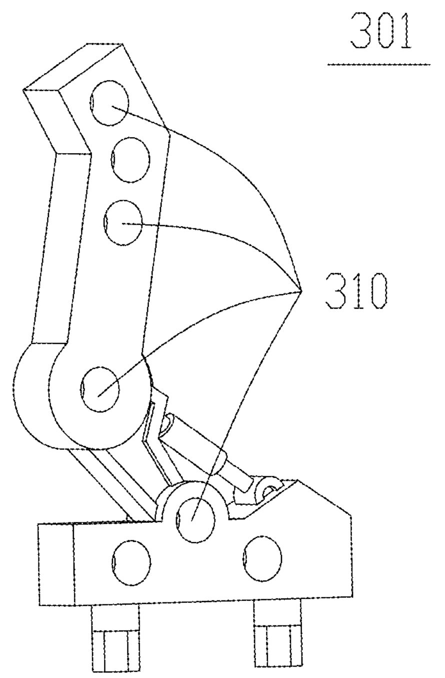
FIG. 14 is a schematic diagram of a force arm connecting rod in the present disclosure.
Figure 15:
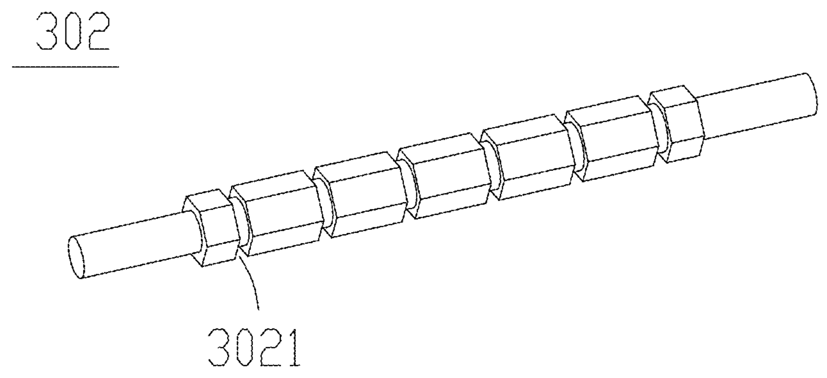
FIG. 15 is a schematic diagram of a third rotating rod in the present disclosure.
Figure 16:
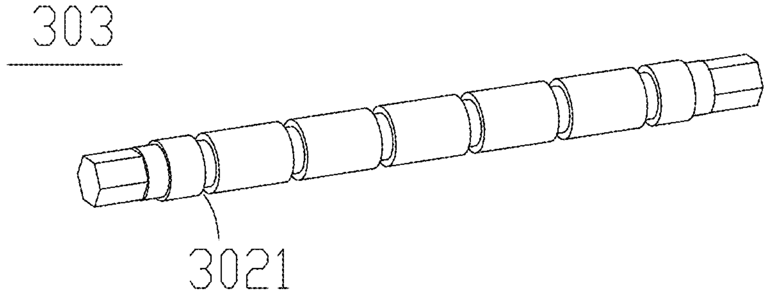
FIG. 16 is a schematic diagram of a fixed rod in the present disclosure.
Figure 17:
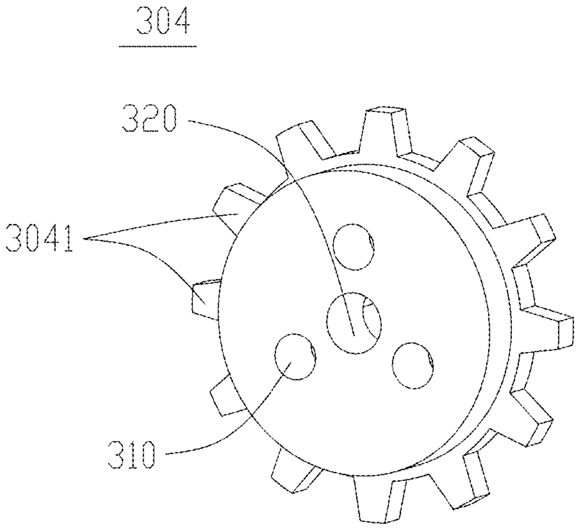
FIG. 17 is a structural diagram of a second cam in the present disclosure.
Figure 18:
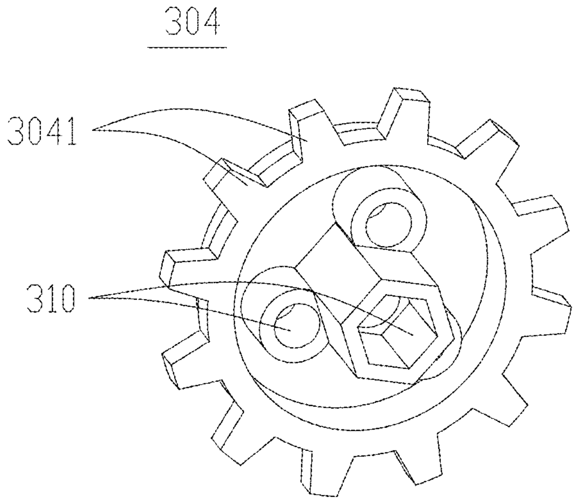
FIG. 18 is a structural diagram of another angle of a second cam in the present disclosure.
Figure 19:
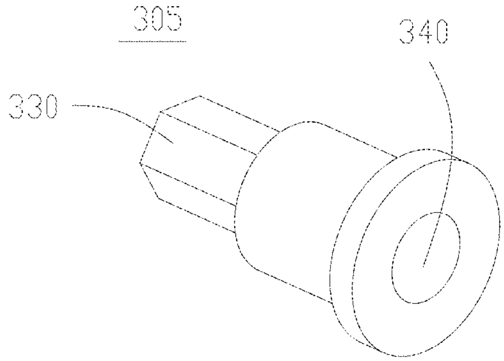
FIG. 19 is a schematic diagram of a switch part in the present disclosure.
Figure 20:
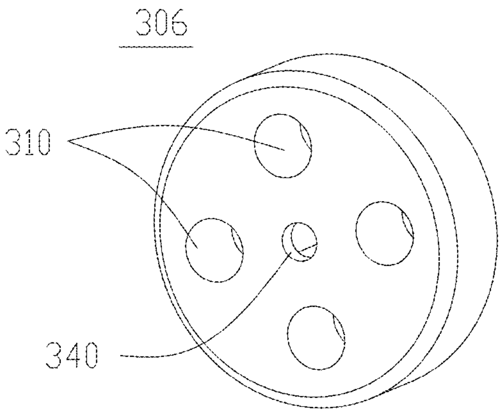
FIG. 20 is a structural diagram of a first cam in the present disclosure.
Figure 21:
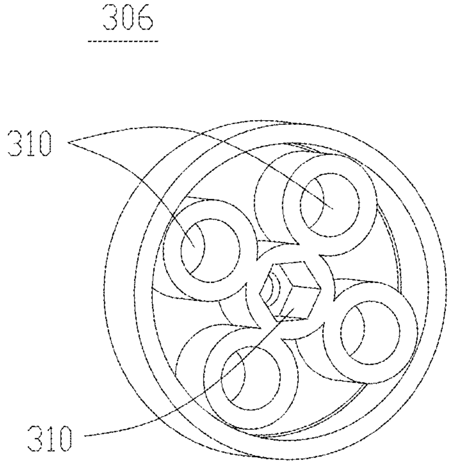
FIG. 21 is a structural diagram of another angle of a first cam in the present disclosure.
Figure 22:
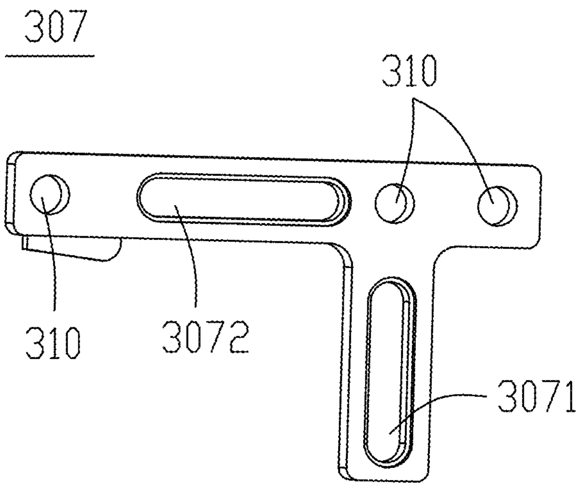
FIG. 22 is a schematic diagram of a T-shaped connecting rod in the present disclosure.
Figure 23:
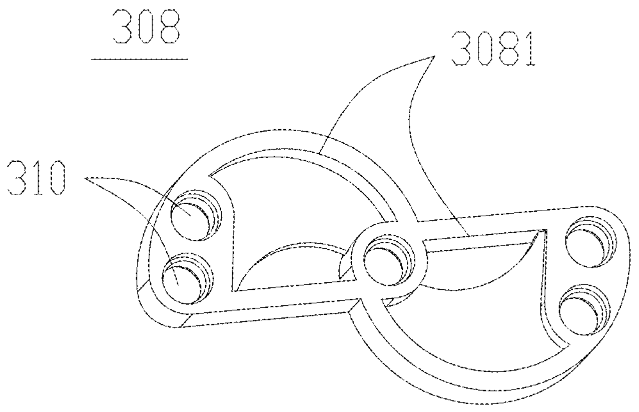
FIG. 23 is a schematic diagram of a symmetrical semicircular piece in the present disclosure.
Figure 24:
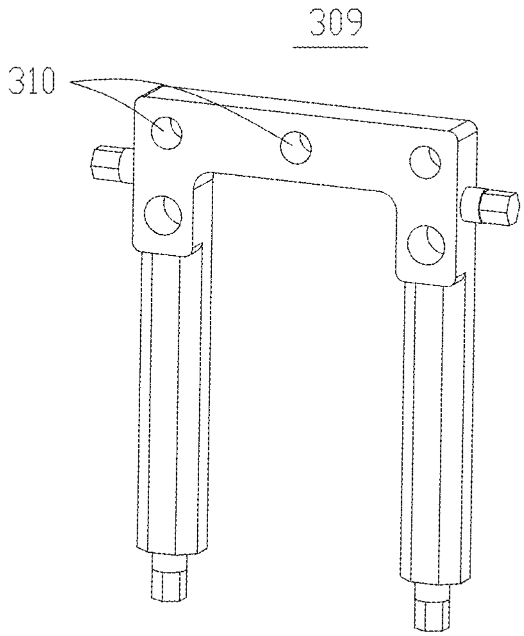
FIG. 24 is a schematic diagram of a U-shaped piece in the present disclosure.
Figure 25:
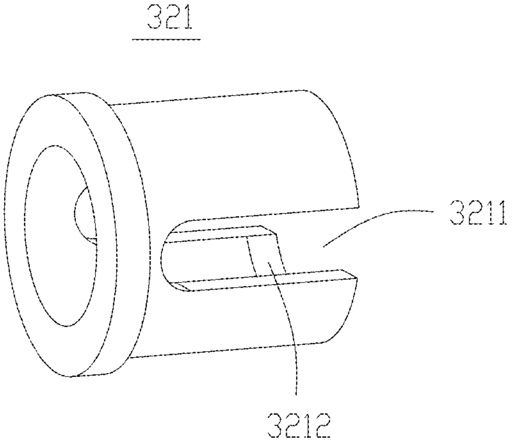
FIG. 25 is a schematic diagram of a fixed sleeve in the present disclosure.
Figure 26:
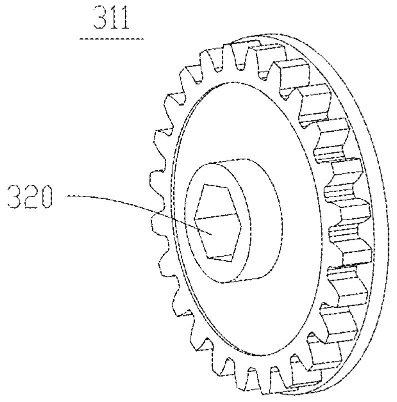
FIG. 26 is schematic diagram of a accessory spur gear in the present disclosure.
Figure 27:
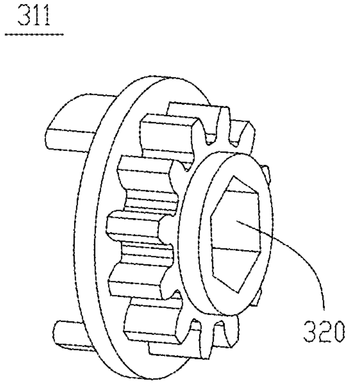
FIG. 27 is schematic diagram of another angle of a accessory spur gear in the present disclosure.
Figure 28:
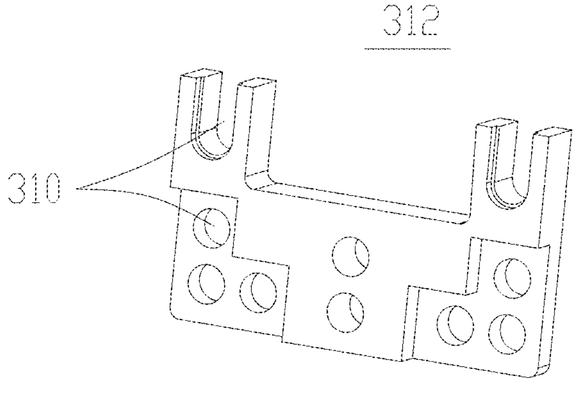
FIG. 28 is a schematic diagram of a fixed plate in the present disclosure.
Figure 29:
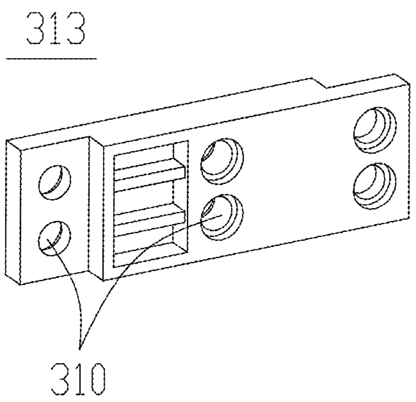
FIG. 29 is a schematic diagram of a connecting plate in the present disclosure.
Figure 30:
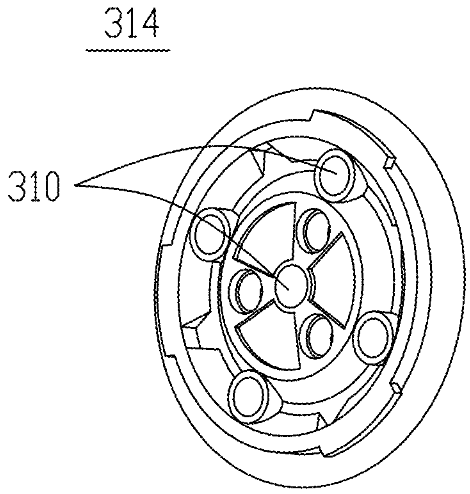
FIG. 30 is a schematic diagram of a wheel in the present disclosure.
Figure 31:
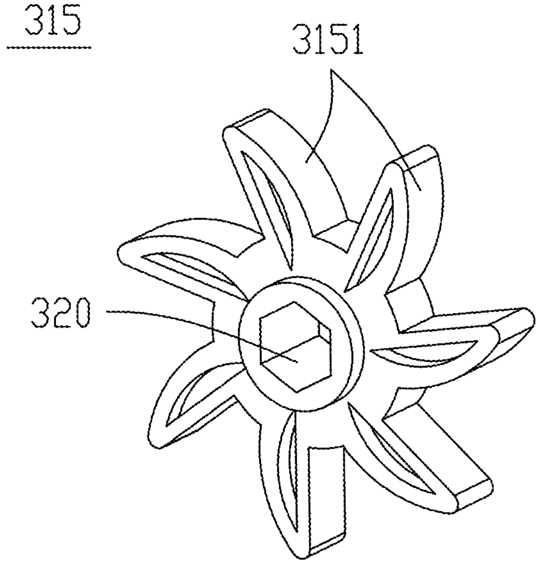
FIG. 31 is a schematic diagram of a fluctuating gear in the present disclosure.
Figure 32:
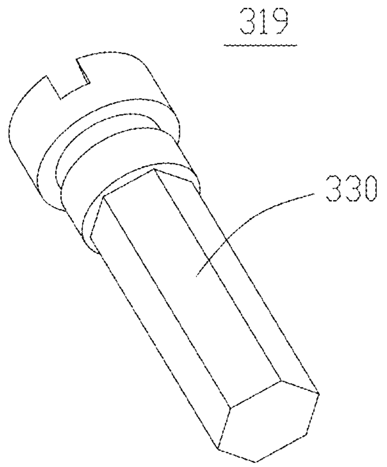
FIG. 32 is a schematic diagram of a bolt in the present disclosure.
Figure 33:
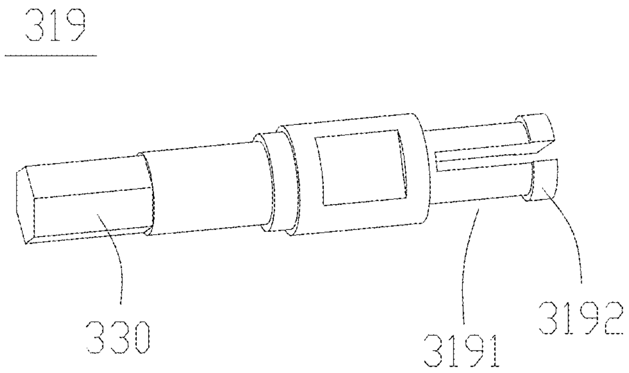
FIG. 33 is a schematic diagram of another bolt in the present disclosure.
Figure 34:
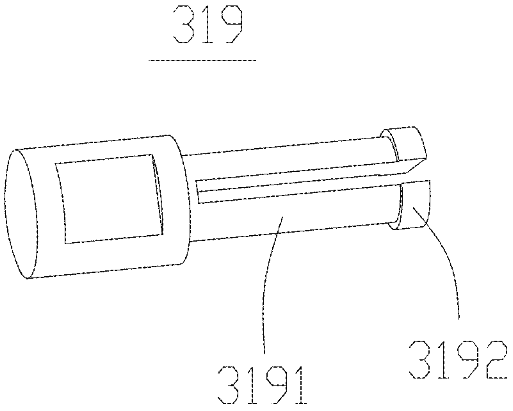
FIG. 34 is a schematic diagram of another bolt in the present disclosure.
Figure 35:
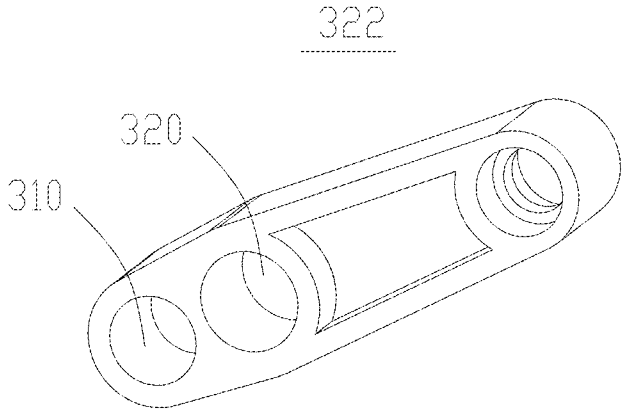
FIG. 35 is a schematic diagram of a straight-line connecting rod in the present disclosure.
Figure 36:
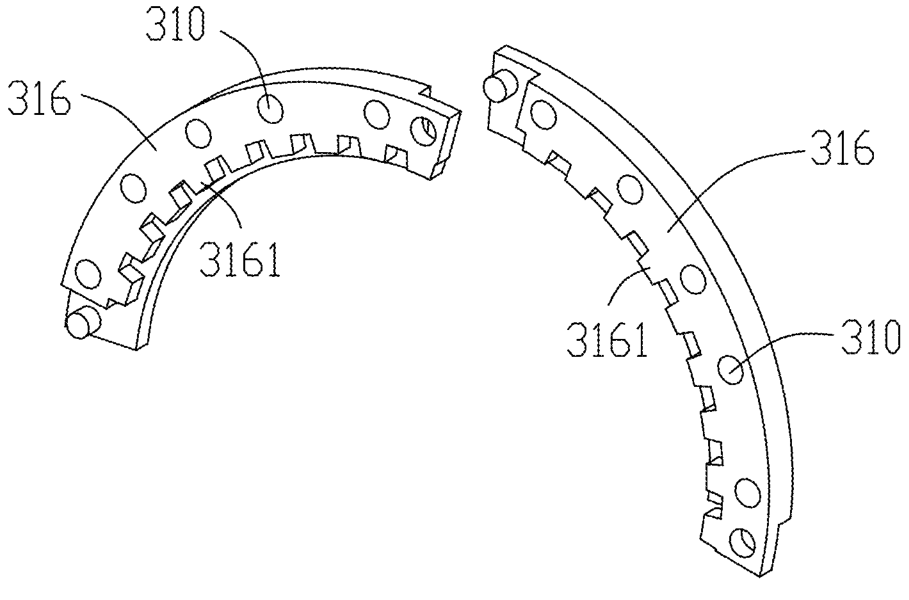
FIG. 36 is an exploded view of two arc-shaped connecting rods in the present disclosure.

In one embodiment, referring to FIG. 13, the first shell 22 protrudes on one side opposite to the second shell 27 to form a plurality of first plugging ends 221, a plurality of first plugging grooves 271 are formed in one side, opposite to the first shell 22, of the second shell 27, and the first plugging end 221 is arranged in the first plugging groove 271 so as to connect the first shell 22 and the second shell 27. The gear box 2 also includes a plurality of reinforcing cover plates 20. A plurality of first clamping holes 201 are formed in the reinforcing cover plate 20. A plurality of first clamping buckles 275 are arranged on both sides of the first shell 22 and the second shell 27. The first clamping buckle 275 is clamped with the first clamping hole 201, so that the reinforcing cover plates 20 are fixed on the first shell 22 and the second shell 27. The connection between the first shell 22 and the second shell 27 can be reinforced by the reinforcing cover plate 20, so that the first shell 22 is prevented from being separated from the second shell 27. In the embodiment, the first shell 22 and the second shell 27 are connected in left and right directions, and the number of the reinforcing cover plates 20 in one gear seat 2 is two, and the reinforcing cover plates 20 are located on the front and rear sides of the gear box 2. In other embodiments, the number of the reinforcing cover plates 20 in one gear box 2 can be four, and the reinforcing cover plates 20 are respectively arranged on four side walls of the gear box 2.

In other embodiments, the first shell 22 can be detachably connected to the second shell 27 directly by means of buckling or screwing, and the connection mode between the first shell 22 and the second shell 27 is not limited herein.

In one embodiment, referring to FIG. 1, the head part 1 is rotatably connected with the gear box 2, and the head part 1 is located at one of the top, front and back positions of the gear box 2, so that the diversity of assembly positions of the head part 1 is improved, and the user can adjust the position of the head part 1 according to the assembled assembly component 3, and the creativity of the user for assembling toys is increased.

Figure 4:
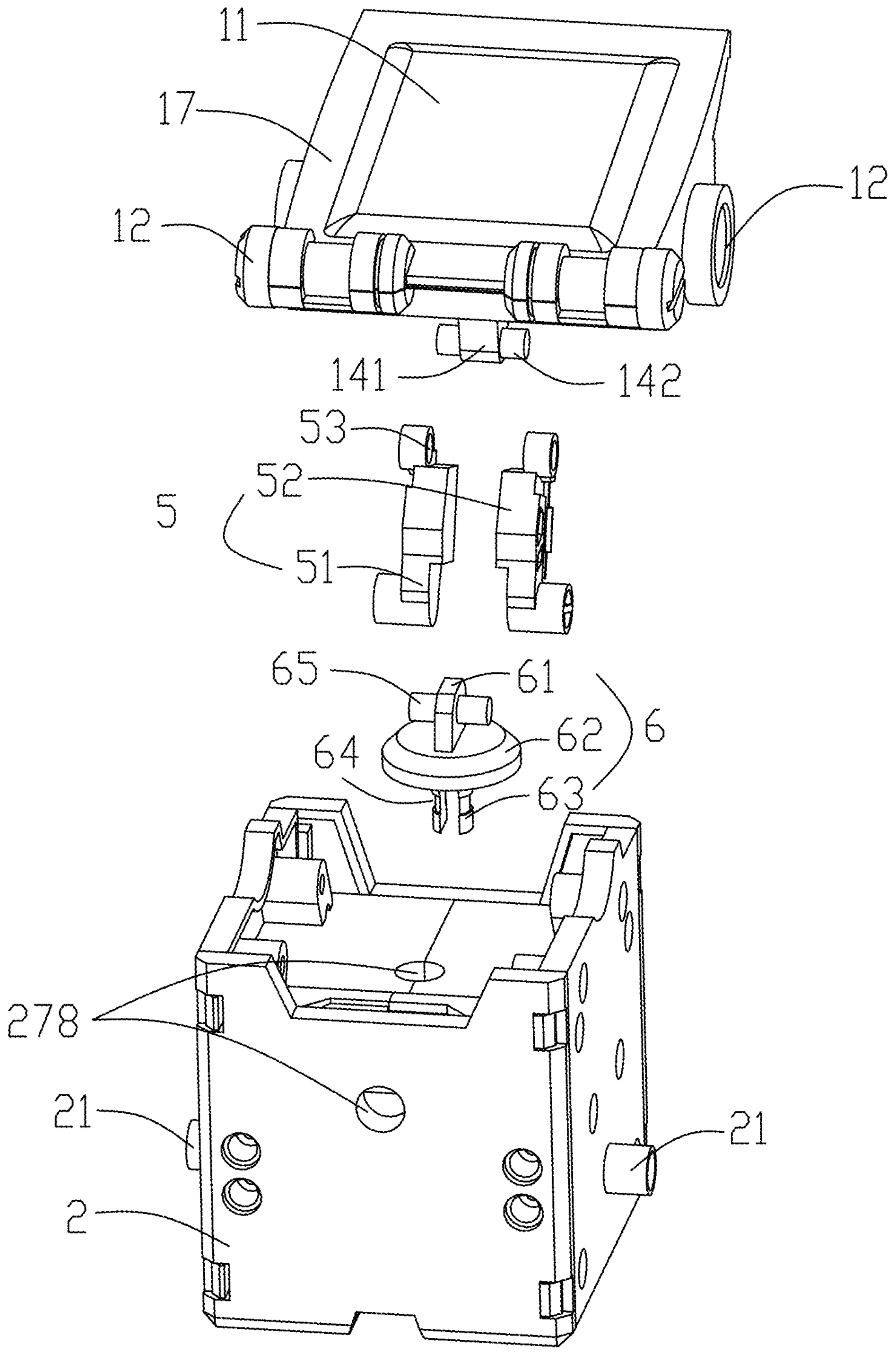
FIG. 4 is an exploded view of a part without an assembly component in the present disclosure.

In one embodiment, referring to FIG. 4, a first connecting rod 6 and a second connecting rod 5 are arranged between the head part 1 and the gear box 2, and the first connecting rod 6 is rotatably connected with the second connecting rod 5. The first connecting rod 6 is configured to drive the head part 1 to rotate along a central axis of the first connecting rod 6 under the action of external force, and the second connecting rod 5 is configured to drive the head part 1 to rotate along a direction perpendicular to the central axis of the first connecting rod 6 under the action of external force. If the head part 1 is mounted on a top surface of the gear box 2, the head part 1 can rotate along the Z axis through the first connecting rod 6, and the head part 1 can rotate along the X axis through the second connecting rod 5. If the head part 1 is mounted on the front side wall of the gear box 2, the head part 1 can rotate along the Y axis through the first connecting rod 6, and the head part 1 can rotate along the X axis through the second connecting rod 5, so that the angle between the head part 1 and the gear box 2 is increased, and the interestingness of assembling the robot toy in the embodiment is increased.

Wherein, it should be noted that the Z axis is in the direction of upper and lower ends of the gear box 2, the X axis is in the front-and-rear direction of the gear box 2, and the Y axis is in the left-and-right direction of the gear box 2.

Specifically, referring to FIG. 4, the first connecting rod 6 includes a first limit plate 62, a fourth clamping block 64 arranged at the bottom of the first limit plate 62, and a third lug 61 arranged on the top of the first limit plate 62. Both sides of the third lug 61 protrude to form a first rotating part 65, the fourth clamping block 64 is a cylinder, and a circumferential bottom of the cylinder protrudes to form an annular clamping block 63. The bottom of the head part 1 protrudes to form a fourth lug 141. Both sides of the fourth lug 141 protrude to form a second rotating part 142. Head assembly holes 278 are formed in the front and rear side walls and the top surface of the gear box 2 at central positions. The second connecting rod 5 includes a left connecting rod 52 and a right connecting rod 51, and shaft holes 53 are formed in upper and lower ends of the left connecting rod 52 and the right connecting rod. The fourth clamping block 64 is plugged into the head assembly hole 278, and the annular clamping block 63 and the first limit plate 62 are limited at both ends of the head assembly hole 278, so that the first connecting rod 6 is rotatably connected with the gear box 2. The shaft holes 53 in the upper and lower ends of the left connecting rod 52 and the right connecting rod respectively sleeve the second rotating part 142 and the first rotating part 65, and the head part 1 is connected with the first connecting rod 6 through the second connecting rod 5, so that the head part 1 can be rotate in a direction perpendicular to the central axis of the first connecting rod 6 under the action of external force, and the rotating angle of the head part 1 can be convenient for the user to adjust.

Certainly, in other embodiments, the head part 1 can be connected to the gear box 2 through the first connecting rod 6 and the second connecting rod 5 in turn, that is, the head assembly hole 278 is formed in the bottom of the head part 1, and the second clamping block 3212 of the first connecting rod 6 is plugged at the bottom of the head part 1. The fourth lug 141 is arranged on the gear box 2, and the first connecting rod 6 and the gear box 2 are connected through the second connecting rod 5, so that the gear box 2 can rotate in multiple directions. The positional relationship and the structures of the first connecting rod 6 and the second connecting rod 5 are not limited here. For example, the second connecting rod 5 can only include a left connecting rod 52.

In one embodiment, the power supply module 11 is a solar panel, so that when the assembly robot toy is arranged by the user in the sunlight, the gear box 2 and the head part 1 can be driven to move by cooperating with the assembly component 3.

Figure 5:
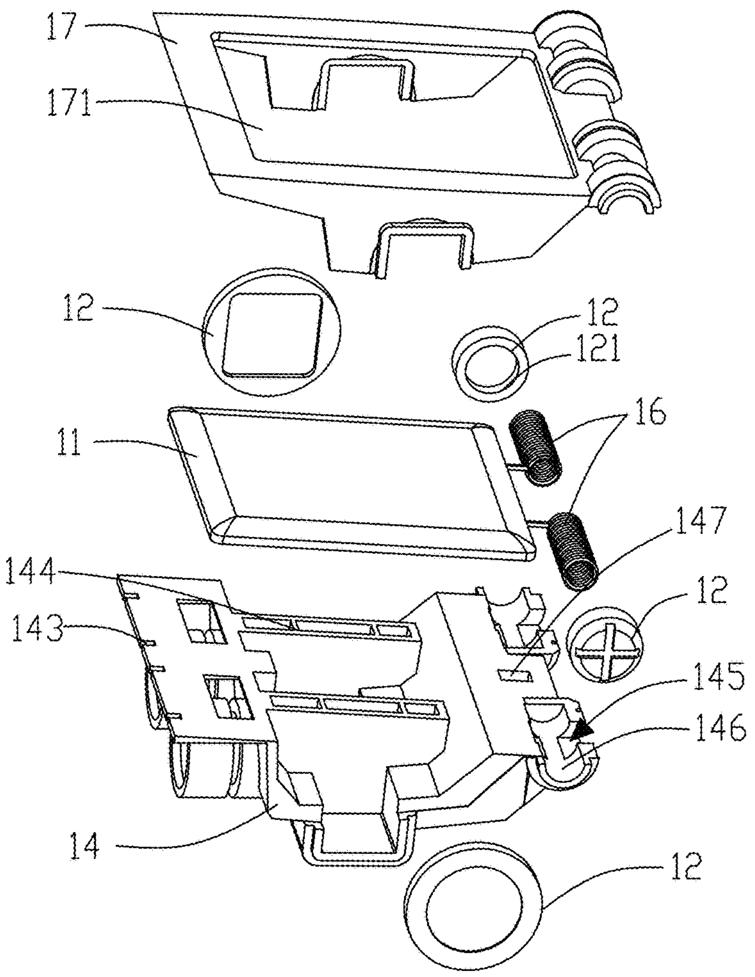
FIG. 5 is an explosive view of a head part in the present disclosure.
Figure 6:
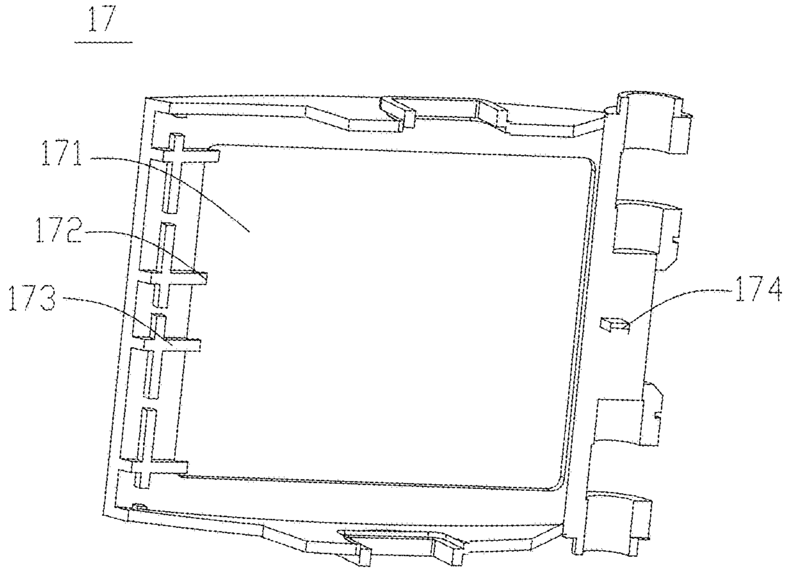
FIG. 6 is a structural diagram of a face shell in the present disclosure.
Figure 7:
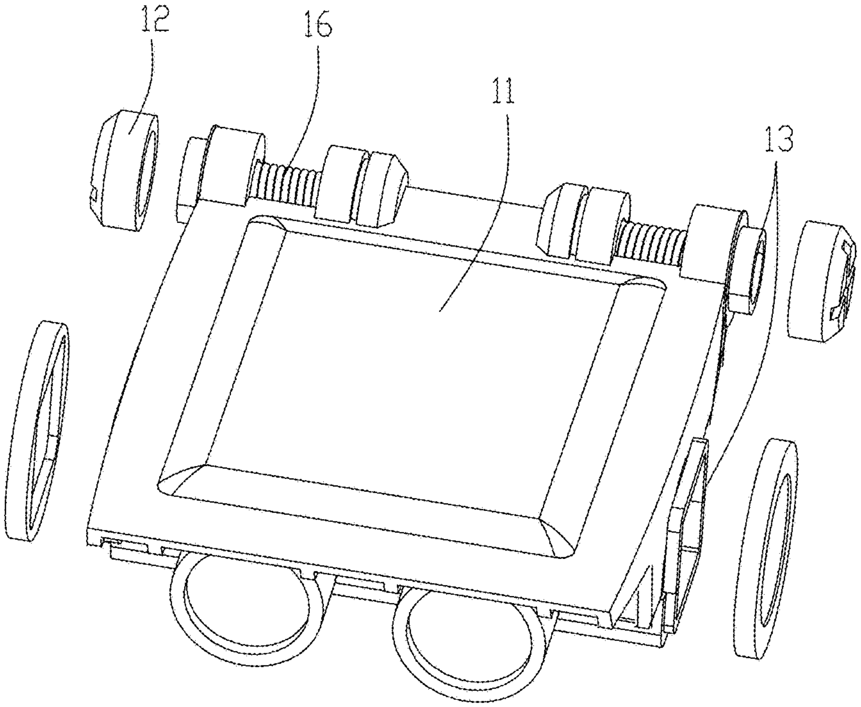
FIG. 7 is an exploded view of a part with a head part in the present disclosure.
Figure 8:
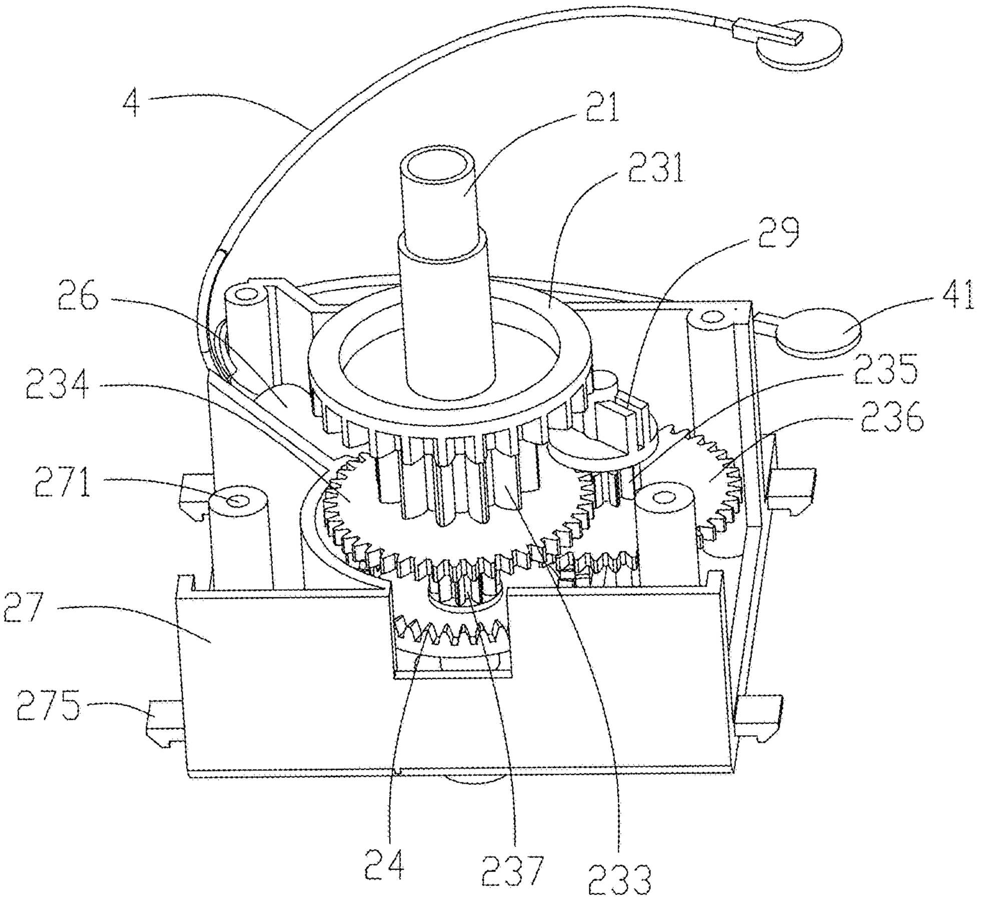
FIG. 8 is an assembly diagram of a gear set, a motor and a transmission rod mounted on a second shell in the present disclosure.

Specifically, in the embodiment, referring to FIG. 5 to FIG. 7, the head part 1 includes a bottom shell 14, a face shell 17 which is detachably connected with the bottom shell 14 and forms a third mounting cavity 144 and two fourth mounting cavities 145 with the bottom shell 14, and two conducting springs 16 respectively arranged in the two fourth mounting cavities 145. The two fourth mounting cavities 145 are arranged at intervals and are both connected with the third mounting cavity 144, and third avoidance holes 145 are formed in the face shell 17 and/or the bottom shell 14 at the positions corresponding to the fourth mounting cavities 145. The solar panel is arranged in the third mounting cavity 144, and a display port 171 is formed in the face shell 17 at the position corresponding to the solar panel, so that the solar panel is irradiated with light energy. The motor 26 is electrically connected with two conducting wires 4, the tail end of the conducting wire 4 is provided with a conducting plate 41, and the conducting plate 41 is plugged in the conducting spring 16. By using the third avoidance hole 145, the conducting plate 41 can be conveniently plugged on the conducting spring 16, and the conducting plate 41 and the conducting spring 16 can be conveniently assembled by the user and electrically connected to the solar panel and the motor 26.

In one embodiment, the conducting spring 16 is integrally welded with the solar panel at the factory. The bottom of one end of the face shell 17 extends downward to form a second plugging end 174, the bottom of the other end of the face shell 17 extends downward to form a plurality of first stop blocks 173 arranged at intervals, and the first stop block 173 protrudes at the bottom of one side opposite to the second plugging end 174 to form a second stop block 172.

A second plugging groove 147 with a length larger than the length of the second plugging end 174 is formed in the bottom shell 14, so that after the solar panel and the conducting spring 16 are mounted in the third mounting cavity 144 and the fourth mounting cavity 145, a front end of the bottom shell 14 is arranged above the second stop block 172, and the second plugging end 174 is arranged in the second plugging groove 147. The length of the second plugging end 147 is larger than that of the second plugging end 174, so that the second plugging end 174 can be conveniently arranged in the second plugging groove 147. The head part 1 also includes a plurality of cover bodies 12 with accommodating grooves 121, the bottom shell 14 is connected with the face shell 17 to form first joint ends 13 on both sides of the head part 1, and the first joint ends 13 are arranged in the accommodating grooves 121. The connection stability of the bottom shell 14 and the face shell 17 can be improved by using the cover bodies 12.

Here, it should be noted that the maximum output power of the solar panel to convert light energy into electric energy is not greater than the maximum power of the motor 26, so that the motor 26 is prevented from being easily damaged when the solar panel is directly connected with the motor 26. Although the voltage output by the solar panel in this way is unstable, the driving of the motor 26 is not influenced. Certainly, in order to stabilize the output voltage of the solar panel, a circuit board may be configured between the solar panel and the motor 26, wherein the circuit board is arranged in the gear box 2 or the head part 1.

In other embodiments, the solar panel can be directly pasted on an upper surface of the head part 1 or embedded in the upper surface of the head part 1, and the conducting plate 41 and the conducting spring 16 can be replaced by connectors, the power supply module 11 can also be a battery, and the bottom shell 14 and the face shell 17 can be detachably connected directly through screws or buckles.

In the embodiment, two second cylinders 15 are formed at the bottom of the bottom shell 14 and form two eyes of the head part 1, and the gear box 2 can be a robot body and is matched with the assembly component 3 to form a robot.

In the above embodiment, referring to FIG. 14 to FIG. 36, the assembly component 3 includes a plurality of bolts 319, fixed plates 312, connecting plates 313, third rotating rods 302, fixed rods 303, first cams 306, second cams 304, fluctuating gears 315, the accessory spur gear 311, straight-line connecting rods 322, force arm connecting rods 301, arc-shaped connecting rods 316, T-shaped connecting rods 307, symmetrical semicircular pieces 308, U-shaped pieces 309 and wheels 314.

Any two of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314 are both detachably connected through one of the bolt 319 and the fixed rod. The accessory spur gear 311 can be used for being meshed with the transmission gear set 200. The accessory spur gear 311, the second cam 304, the fluctuating gear 315 and the wheel 314 further can detachably sleeve the third rotating rod 302 or the fixed rod 303, and the second cam 304 is detachably plugged in the transmission rod 21. Thus, the user can assembly the assembly component 3 on the gear box 2 according to thoughts in a self-defined manner so as to realize the assembly of the robot.

Specifically, the bolt 319 includes a rotating pin and a fixed pin. Wherein, one end of the rotating pin, both ends of the fixed pin and both ends of the fixed rod 303 are all polygonal cylinders 330, and one end of the rotating pin is a first cylinder 3191, and the first cylinder 3191 protrudes outward at one end away from the first polygonal cylinder 330 to form a third clamping block 3192.

A plurality of first assembly holes 310 which can be matched with the polygonal cylinder 330 and the first cylinder 3191 are formed in the side wall of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314. Any two of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314 are both detachably connected through one of the rotating pin, the bolt 319 and the fixed rod 303. A second assembly hole 320 for plugging the fixed rod 303 and the third rotating rod 302 is formed in the middle of the accessory spur gear 311, the second cam 304 and the fluctuating gear 315, so that the accessory spur gear 311, the second cam 304 and the fluctuating gear 315 can sleeve the fixed rod 303 and the third rotating rod 302. Besides the first assembly hole 310, a third assembly hole 340 is formed in the middle of the first cam 306, and is used for being matched and connected with both ends of the third rotating rod 302.

Wherein, the first assembly hole 310 and the third assembly hole 340 are both circular holes. The diameter of the third assembly hole 340 is slightly smaller than that of the third assembly hole 340. The second assembly hole 320 is a polygonal hole. The longest width of the polygonal cylinder 330 is matched with the diameter of the first assembly hole 310. The diameter of the first cylinder 3191 is slightly smaller than that of the first assembly hole 310. The width of the third clamping block 3192 is slightly larger than that of the first assembly hole 310. In this way, the polygonal cylinders 330 on the bolt 319 and the rotating pin pass through the first assembly holes 310 of two parts, so that the two parts can be fixed and difficult to rotate. The first cylinder 3191 on the rotating pin passes through the first assembly holes 310 in the two parts, so that the two parts rotate mutually. And, the first cylinder 3191 passes through the first assembly hole 310 of one part, and the part can rotate along the first cylinder 3191.

The diameters of both ends of the third rotating rod 302 are smaller than the diameter of the first assembly hole 310 and are matched with the size of the third assembly hole 340. The assembly component 3 also includes a switch part 305. A third assembly hole 340 for plugging and connecting both ends of the third rotating rod 302 is formed in one end of the switch part 305. One end of the switch part 305 is also a polygonal cylinder 330 which is matched with the size of the first assembly hole 310, so that the third rotating rod 302 can rotate after passing through the first assembly hole 310, and then the switch part 305 is used for connecting the wheel 314, the second cam 304 and other parts.

A first sliding hole 3071 and a second sliding hole 3072 perpendicular to the first sliding hole 3071 are formed in the T-shaped connecting rod 307, and the widths of the first sliding hole 3071 and the second sliding hole 3072 are the same as the diameter of the first assembly hole 310. The first cylinder 3191 of the rotating pin is clamped and limited with the second sliding hole 3072 and the first sliding hole 3071 through the third clamping block 3192 after passing through the second sliding hole 3072 and the first sliding hole 3071, so that the first cylinder 3191 of the rotating pin can move back and forth along the length directions of the second sliding hole 3072 and the first sliding hole 3071.

The fluctuating gear 315 is provided with a plurality of arc-shaped teeth 3151 arranged around the fluctuating gear 315. The fluctuating gear 315 can be used for decoration or two adjacent arc-shaped teeth 3151 can accommodate one end of the straight-line connecting rod 322. The symmetrical semicircular piece 308 is formed by connecting two semicircular plates 3081 in central symmetry. A side wall of the second cam 304 is surrounded by first gear teeth 3041. The inner side of the arc-shaped connecting rod 316 is provided with second gear teeth 3161 meshed with the second cam 304, so that the assembly is convenient for the user.

In one embodiment, at least one plane is formed on an outer side wall of the third rotating rod 302. The shape of the second assembly hole 320 is consistent with the outer side wall of the third rotating rod 302, so that when the accessory spur gear 311 and the second cam 304 sleeve the third rotating rod 302, the third rotating rod 302 rotates to drive the accessory spur gear 311 and the second cam 304 to move and rotate, or when the accessory spur gear 311 and the second cam 304 rotate, the third rotating rod 302 is driven to rotate.

Specifically, the cross section of the outer side wall of the third rotating rod 302 is a hexagon, a pentagon, an octagon and the like. The cross section of an outer side wall of the fixed rod 303 is circular. The diameter of the fixed rod 303 is equal to the distance between two opposite sides of the hexagon, so that when the accessory spur gear 311 and the second cam 304 sleeve the fixed rod 303, the fixed rod 303 does not hinder the rotation of the accessory spur gear 311 and the second cam 304, and the assembly is convenient for the user.

In one embodiment, a plurality of annular clamping grooves 3021 are formed in the outer side walls of the fixed rod 303 and the third rotating rod 302 at equal intervals. The assembly component 3 also includes a plurality of fixed sleeves 321 sleeving the fixed rod 303 or the third rotating rod 302. At least one U-shaped opening 3211 is formed in a side wall of the fixed sleeve 321. One end of an inner side wall of the fixed sleeve 321 protrudes inward to form a second clamping block 3212 matched with the annular clamping groove 3021. And then, in order to fix the position of the accessory spur gear 311 and the second cam 304 on the fixed rod 303 or the third rotating rod 302, fixed sleeves 321 can respectively sleeve the third rotating rods 302 on both sides of the third gear and the second cam 304, and the second clamping block 3212 is clamped with the annular clamping groove 3021 to fix the fixed sleeve 321 on the third rotating rod 302 so as to limit the third straight gear 3102 and the second cam 304 on the fixed rod 303 or the third rotating rod 302.

Figure 37:
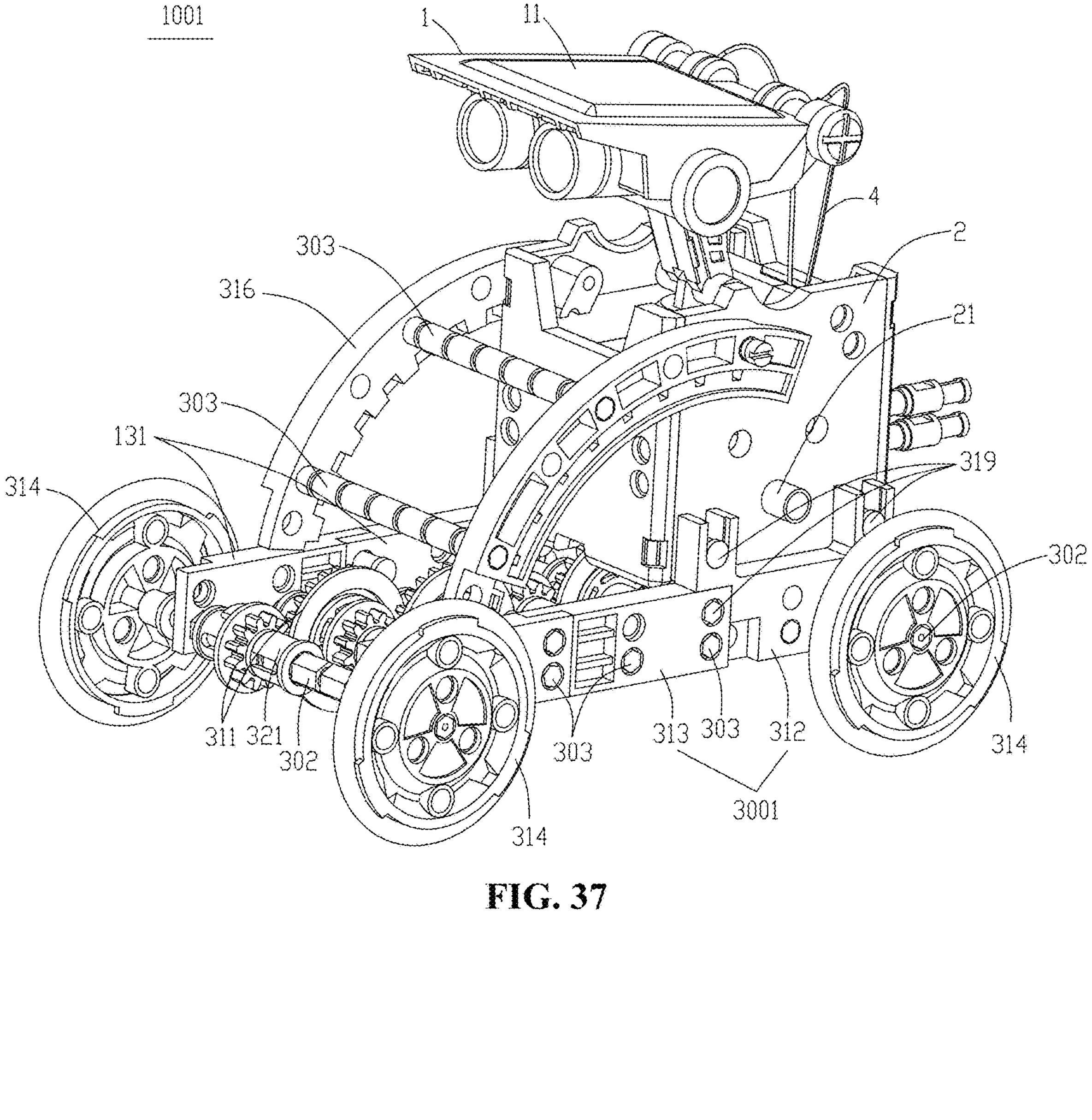
FIG. 37 is a schematic diagram of the form of a baby carriage robot in the present disclosure.
Figure 38:
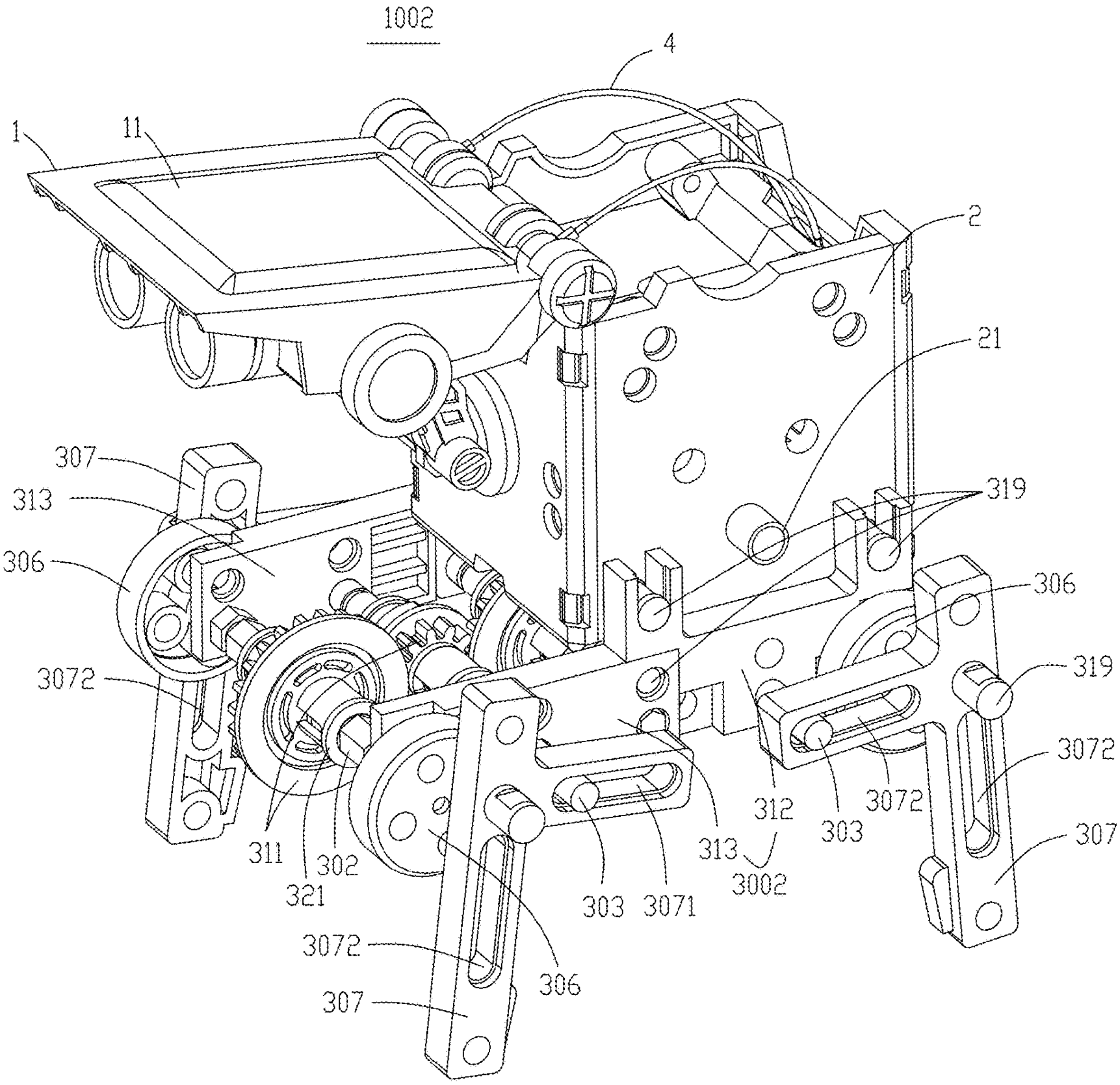
FIG. 38 is a schematic diagram of the form of a quadruped robot in the present disclosure.
Figure 39:
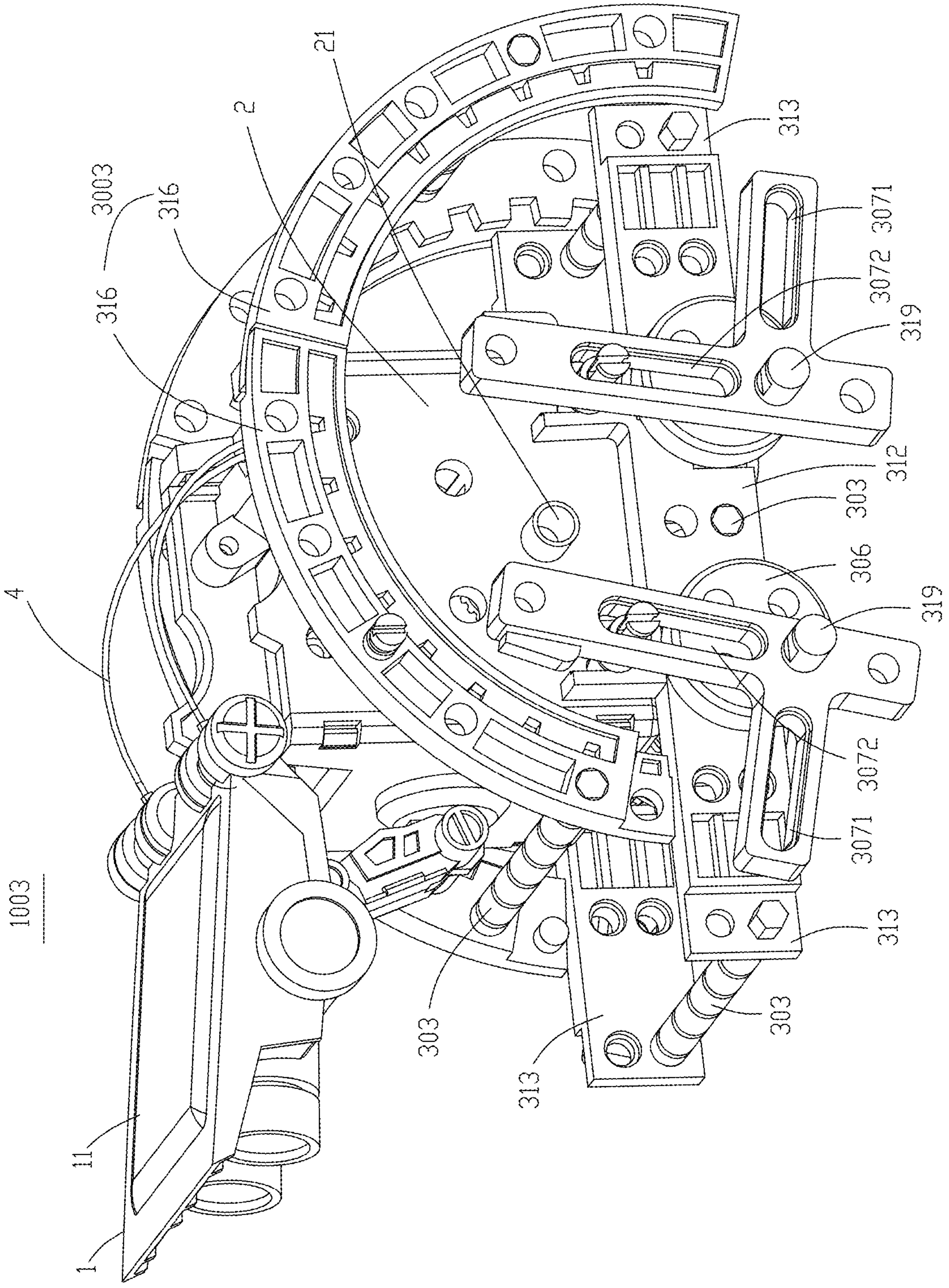
FIG. 39 is a schematic diagram of the form of a turtle robot in the present disclosure.
Figure 40:
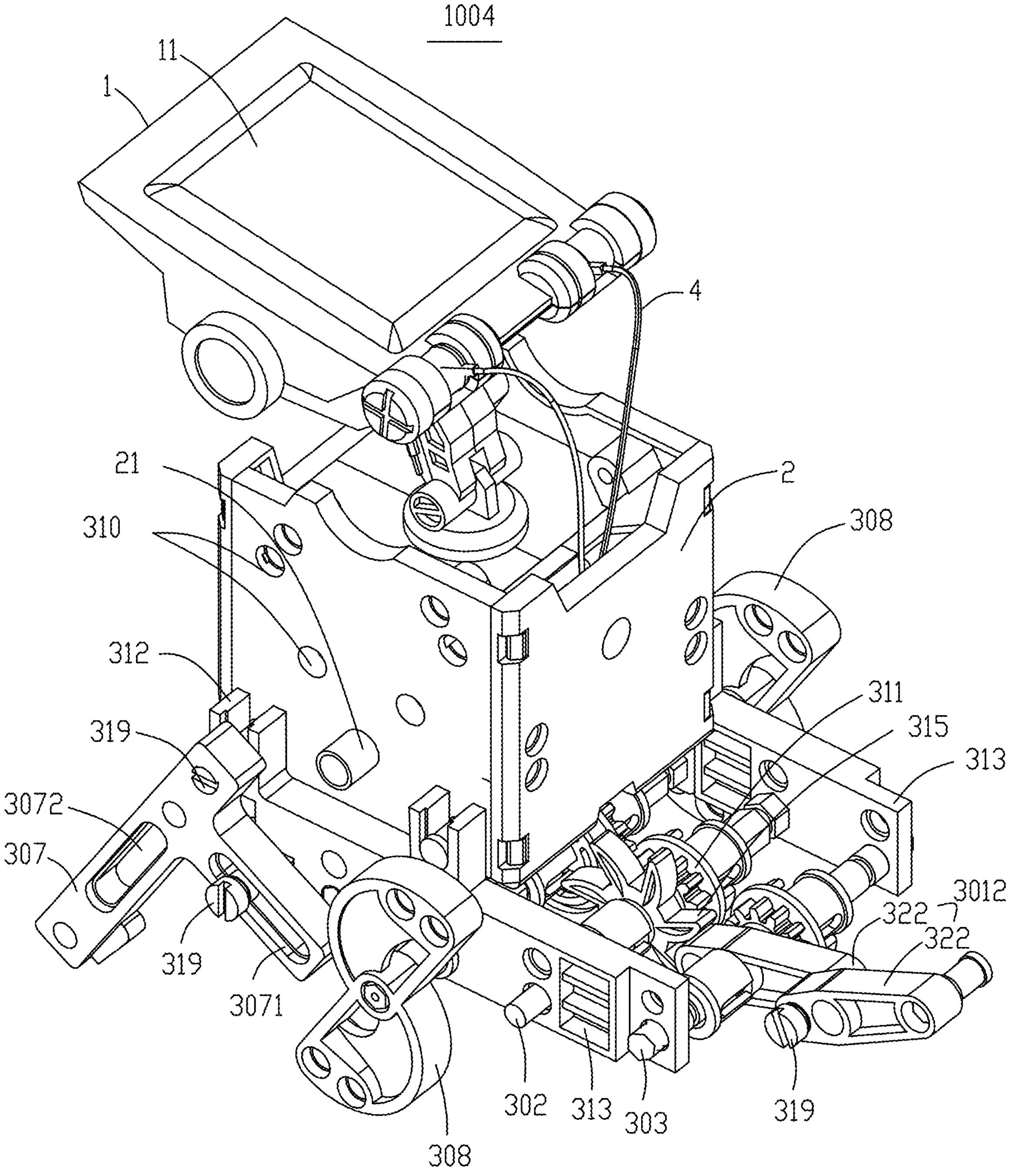
FIG. 40 is a schematic diagram of the form of a puppy robot in the present disclosure.
Figure 41:
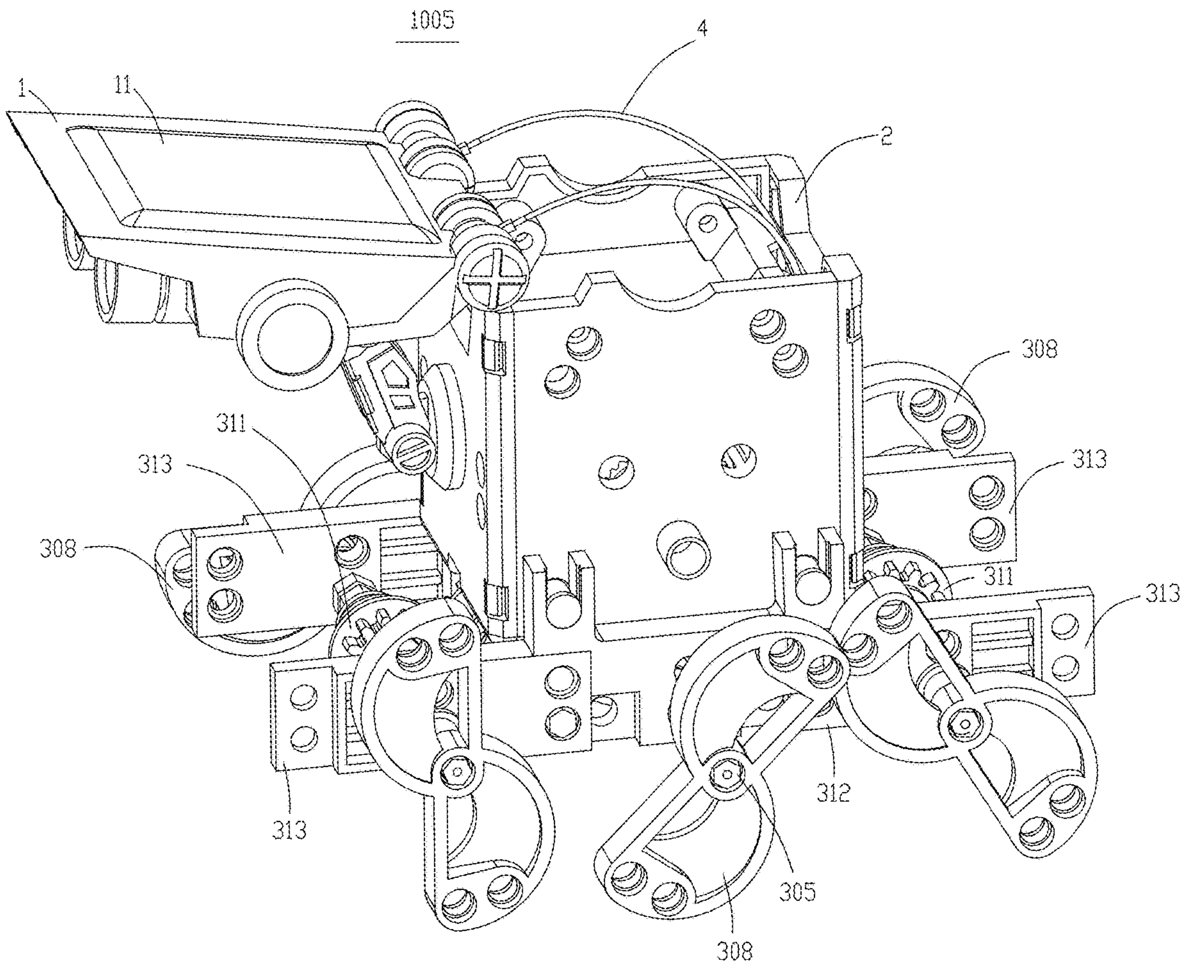
FIG. 41 is a schematic diagram of the form of a beetle robot in the present disclosure.
Figure 42:
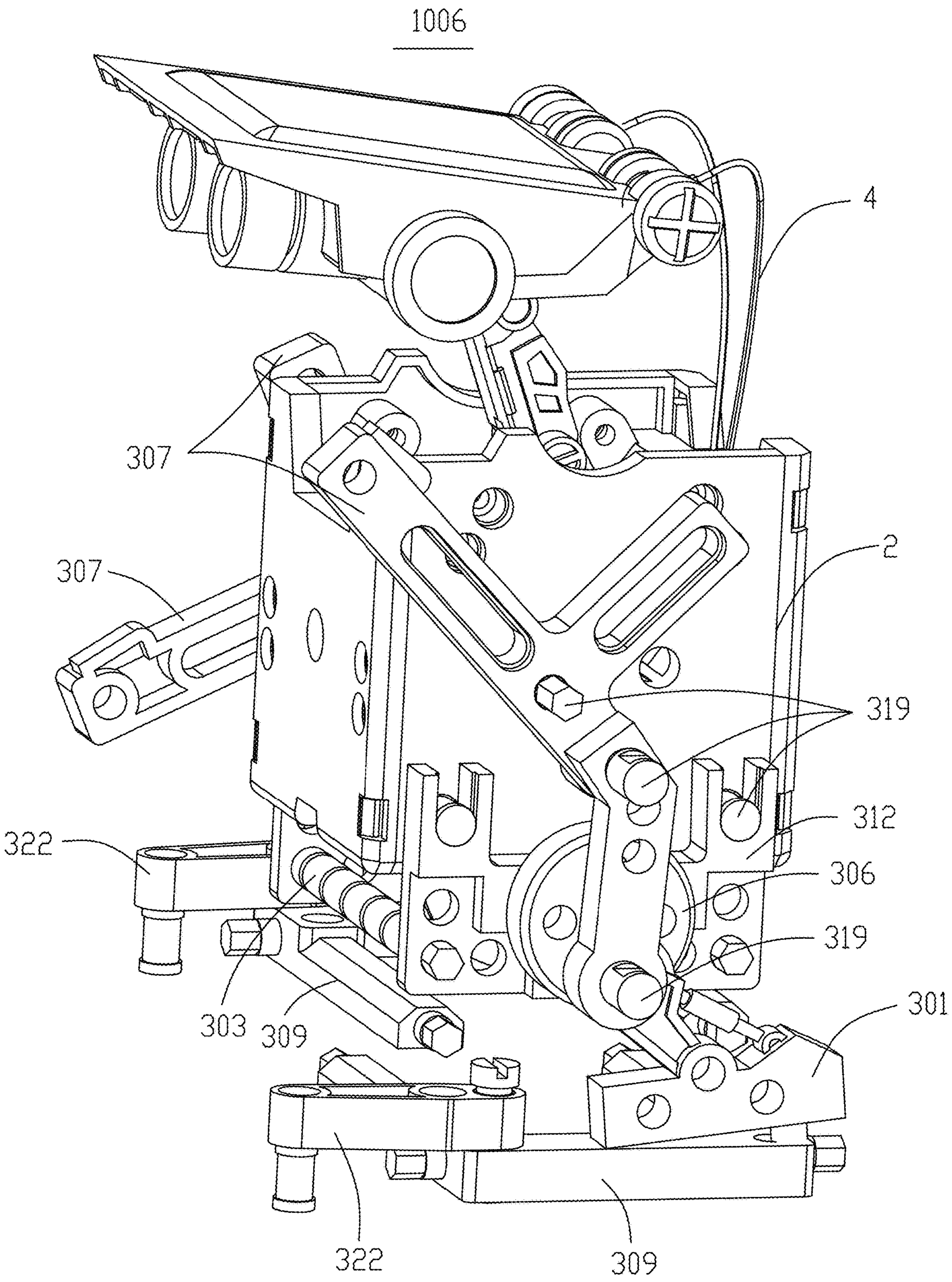
FIG. 42 is a schematic diagram of the form of a Walker robot in the present disclosure.
Figure 43:
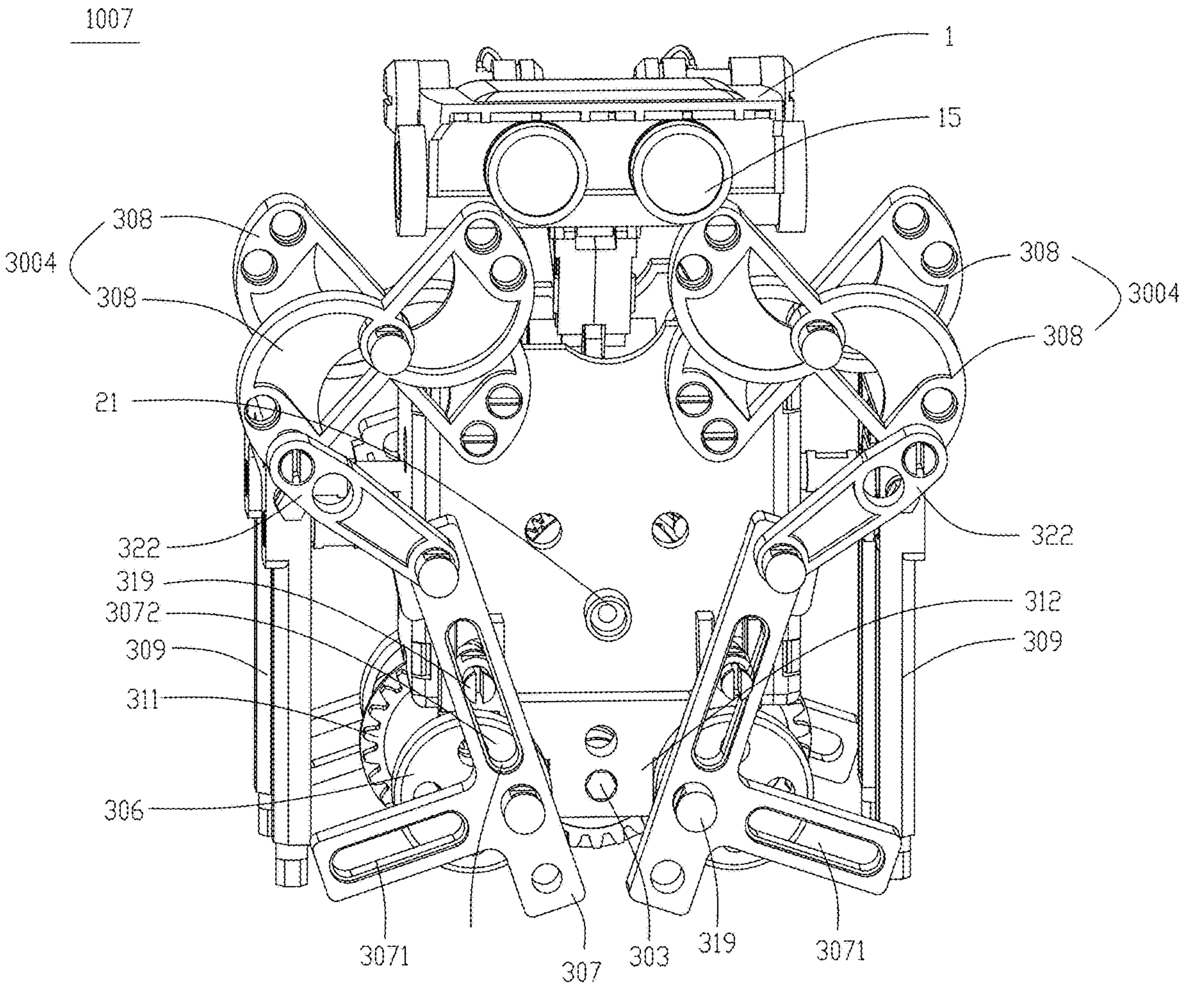
FIG. 43 is a schematic diagram of the form of a crab robot in the present disclosure.
Figure 44:
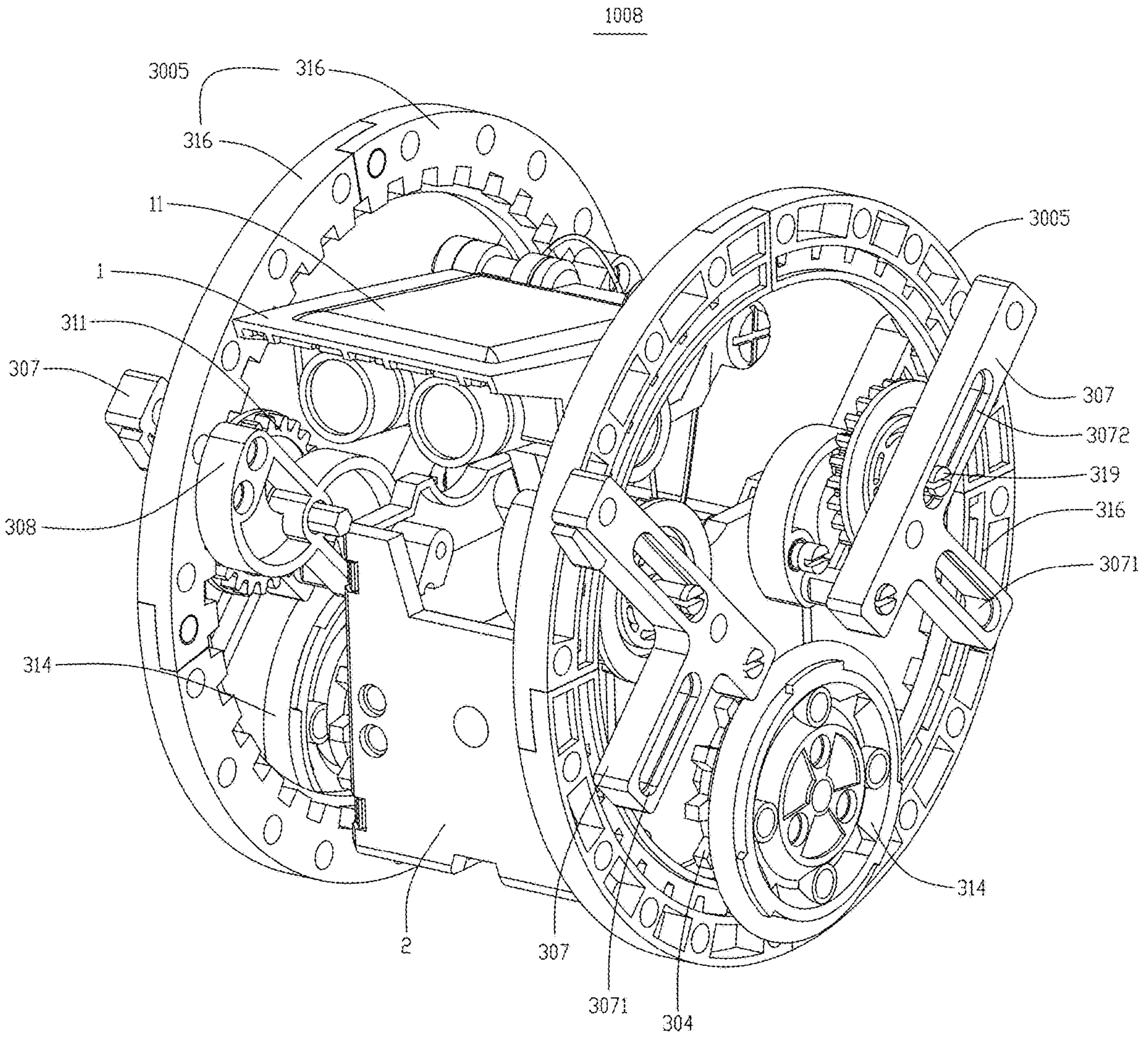
FIG. 44 is a schematic diagram of the form of a pudgy robot in the present disclosure.
Figure 45:
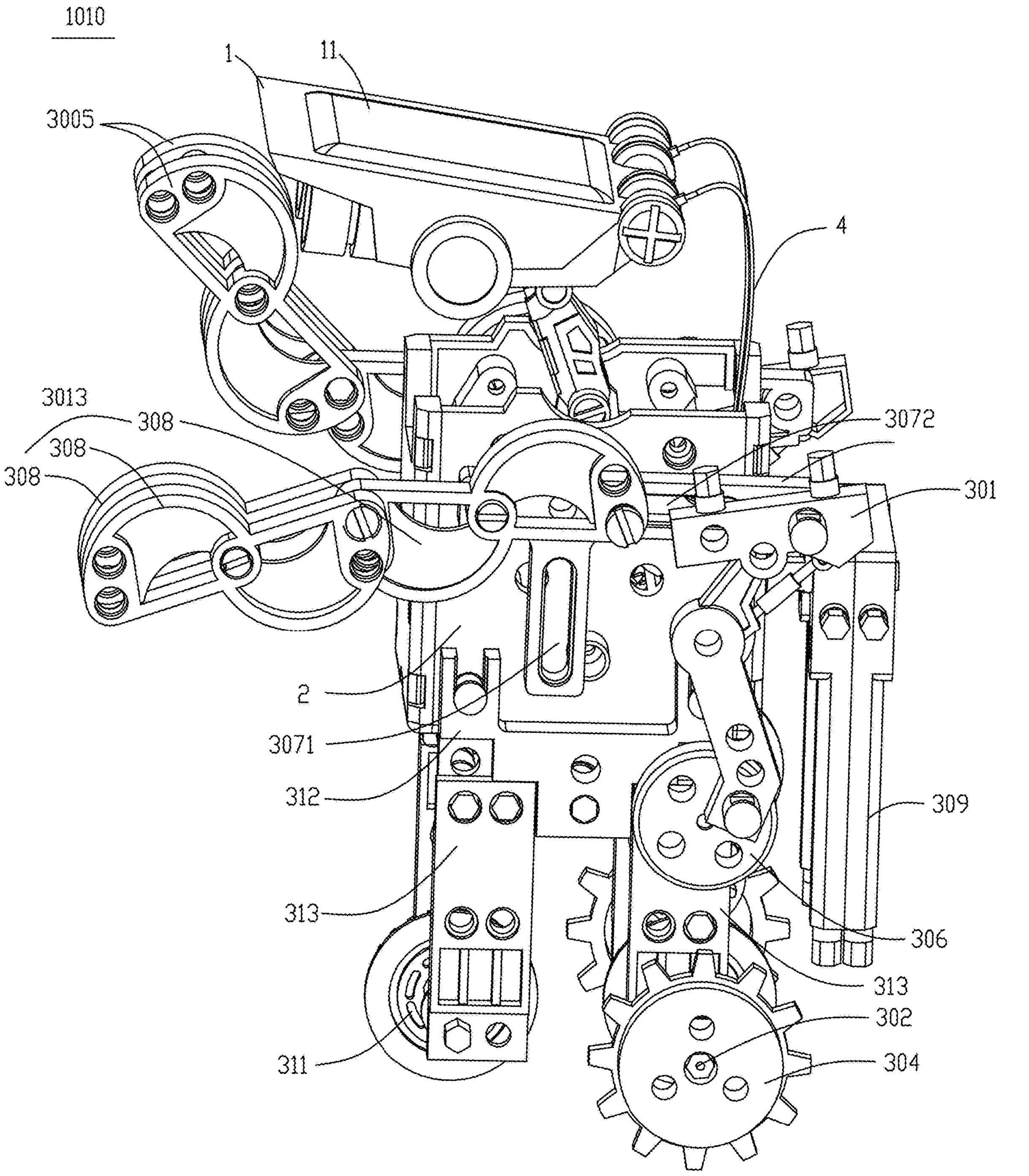
FIG. 45 is a schematic diagram of the form of a zombie robot in the present disclosure.
Figure 46:
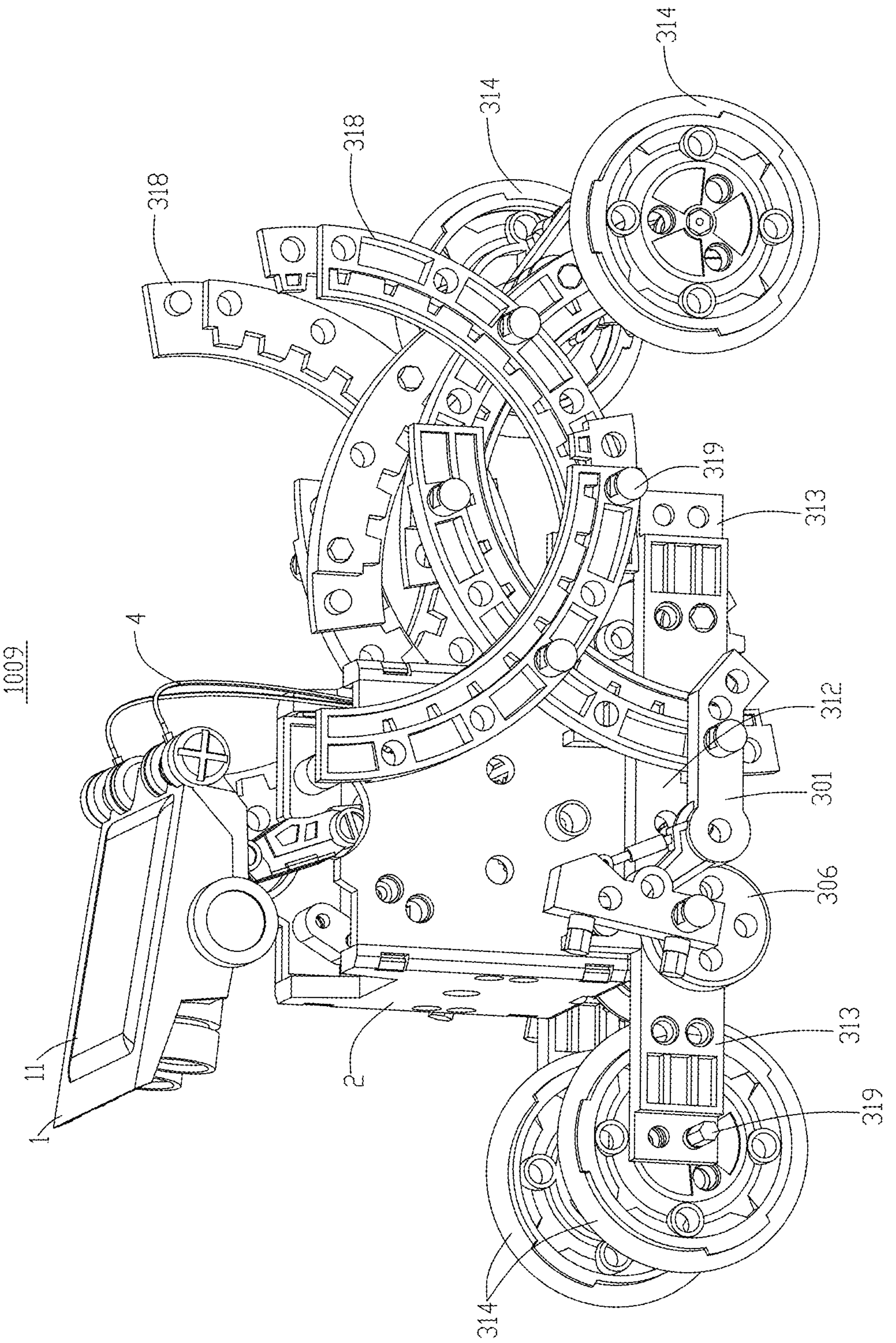
FIG. 46 is a schematic diagram of the form of a crawling robot in the present disclosure.
Figure 47:
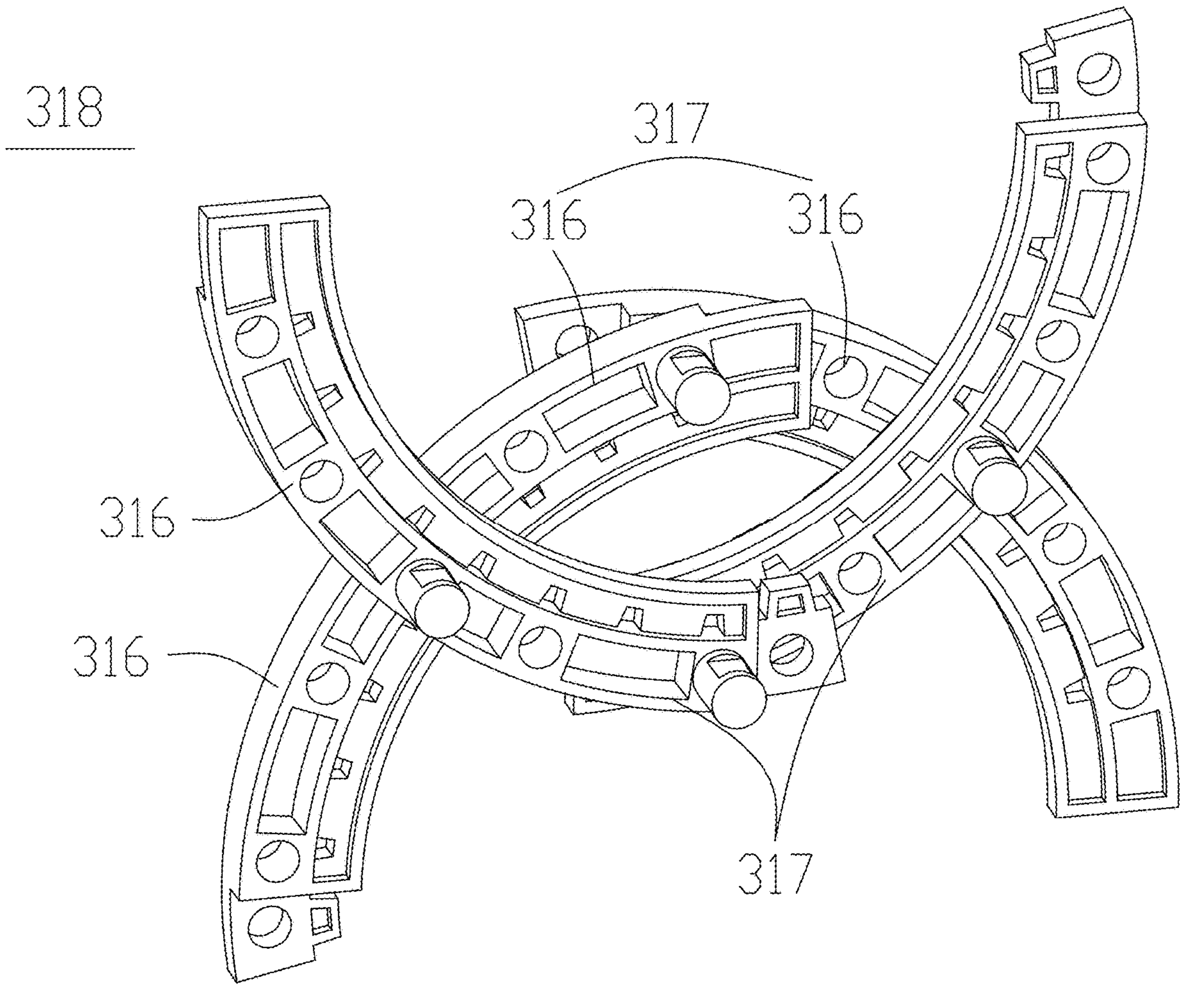
FIG. 47 is a schematic diagram of the form of a crawling assembly in the present disclosure.

In the above embodiment, referring to FIG. 37 to FIG. 50, the numbers of the gear box 2 and the head part 1 may be plural. In cooperation with the assembly component 3, the shape of the assembly robot toy may be assembled into a baby carriage robot 1001 (as shown in FIG. 37), a quadruped robot 1002 (as shown in FIG. 38), a turtle robot 1003 (as shown in FIG. 39), a puppy robot 1004 (as shown in FIG. 40), a beetle robot 1005 (as shown in FIG. 41), a Walker robot 1006 (as shown in FIG. 42), a crab robot 1007 (as shown in FIG. 43), a pudgy robot 1008 (as shown in FIG. 44), a crawling robot 1009 (as shown in FIG. 45), a zombie robot 1010 (as shown in FIG. 46) and the like.

Specifically, when the assembly robot toy is assembled into a crawling robot 1009, parts needed for the crawling robot 1009 and the positional relationship of the parts crawl follows.

Figure 49:
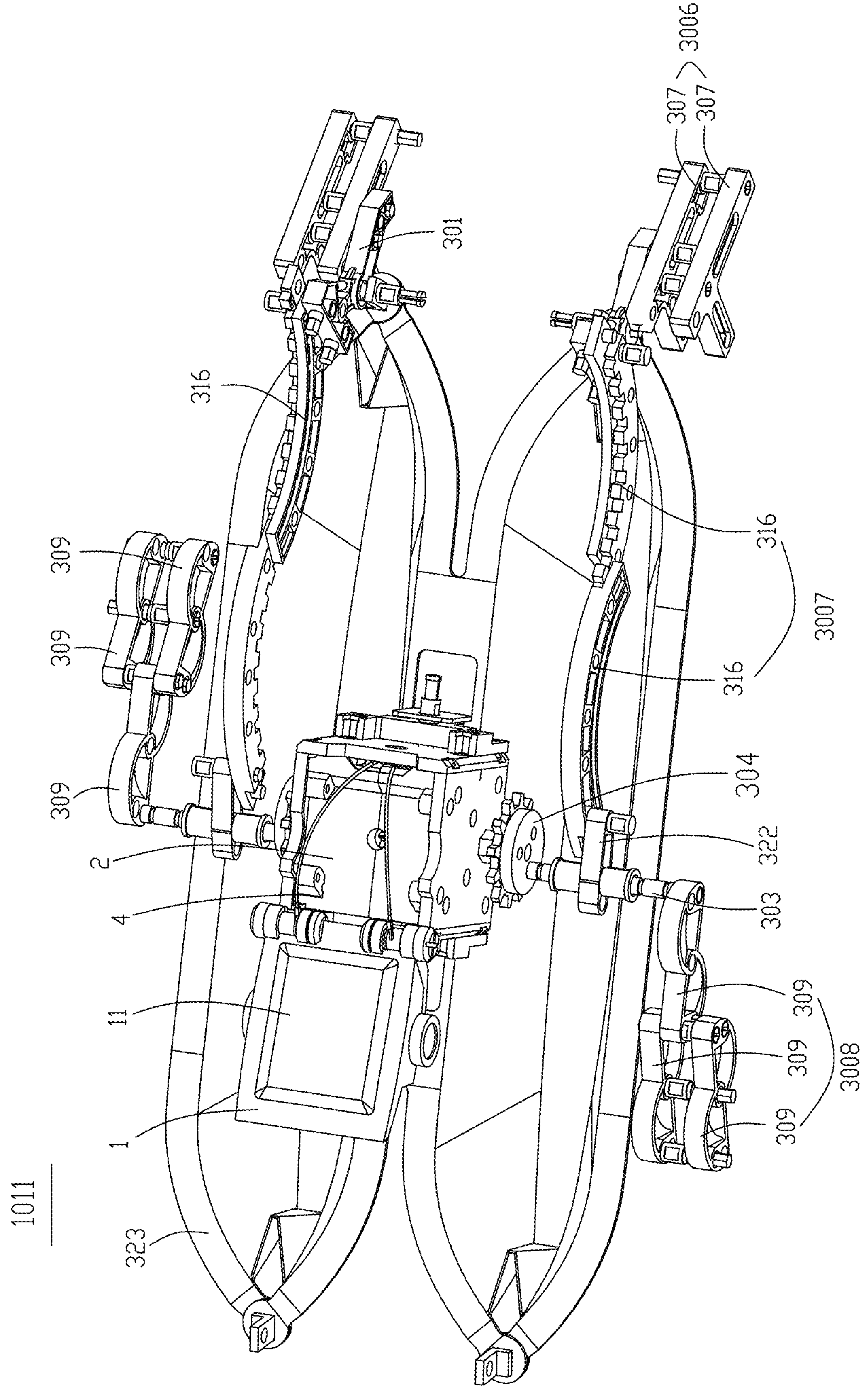
FIG. 49 is a schematic diagram of the form of a surfing robot in the present disclosure.
Figure 50:
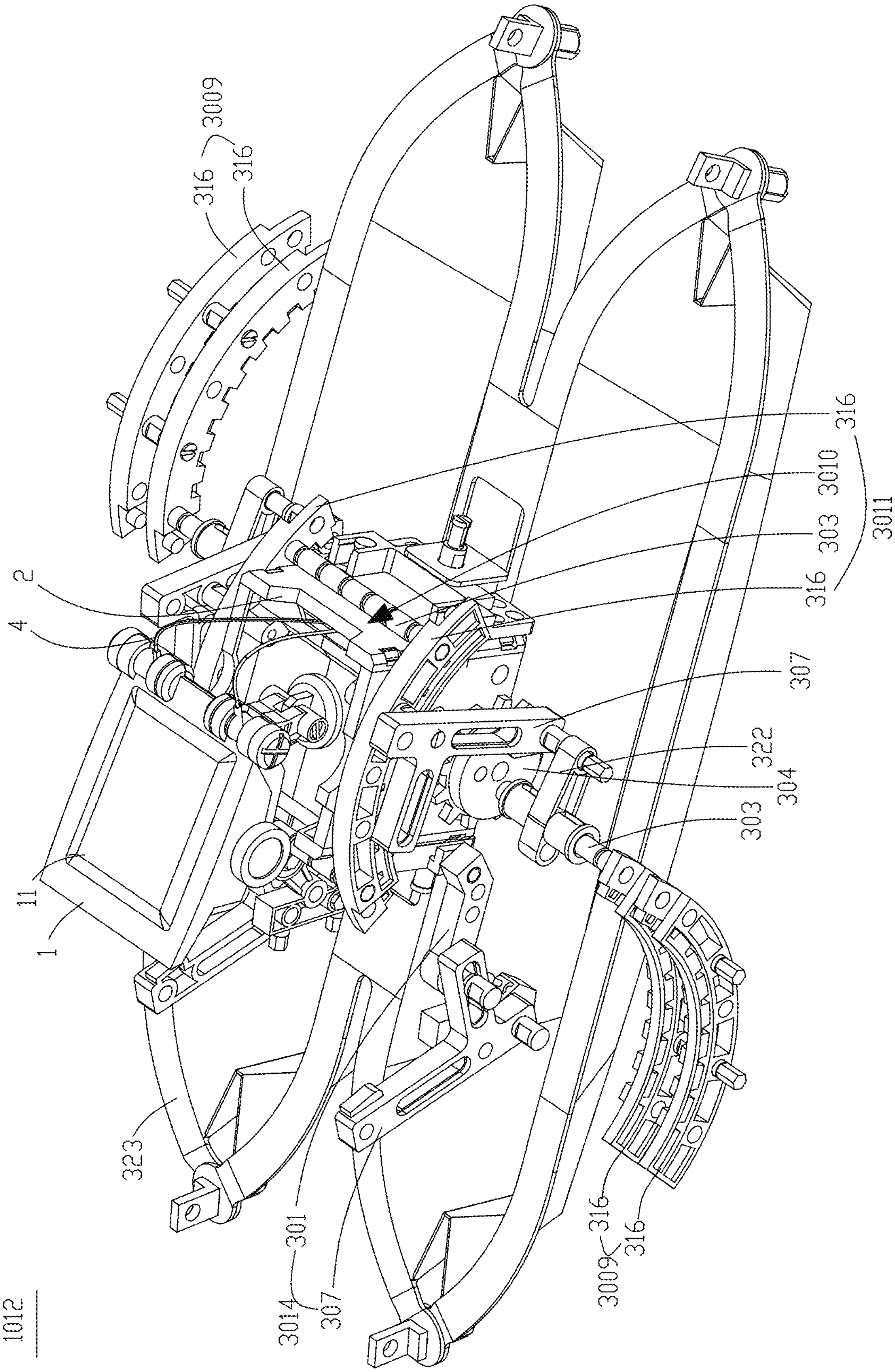
FIG. 50 is a schematic diagram of the form of a bowing robot in the present disclosure.

Referring to FIG. 49 and FIG. 50, the numbers of the gear boxes 2 and the head parts 1 are one, and the head part 1 is arranged on the top of the gear box 2. The number of the fixed plates 312 is two, and the two fixed plates 312 are respectively detachably arranged on the left and right sides of the gear box 2 through bolts. The number of the connecting rods is four, and the four connecting rods are respectively arranged at the front and rear ends of the two fixed plates 312. Wherein, the fixed plate 312 and the connecting plate 313 are connected through bolts. The numbers of the first cams 306, the force arm connecting rods 301 and the third rotating rods 302 are two. The number of the fixed rods 303 is at least two. The number of the wheels 314 is four. The number of the arc-shaped connecting rods 316 is eight. Both ends of one third rotating rod 302 are connected with a central position of the first cam 306 after respectively passing through the front ends of two opposite fixed plates 312. Both ends of one fixed rod 303 are respectively connected with the rear ends of the two opposite fixed plates 312. One end of each of every two arc-shaped connecting rods 316 is rotatably connected through a bolt to form a similarly semicircular connecting rod 317. Three-quarters and one-quarter positions of every two similarly semicircular connecting rods 317 are connected through a bolt to form a crawling component 318. The opening directions of the two similarly semicircular connecting rods 317 in the crawling component 318 are opposite. Both ends of each force arm connecting rod 301 are respectively connected with a non-central position of the first cam 306 and one end of the crawling component 318 through bolts. Both ends of one third rotating rod 302 are connected with the wheels 314 after respectively passing through the other end of the crawling component 318. The two wheels 314 are respectively connected with the front ends of two opposite connecting plates 313 at the front end of the fixed plate 312 through bolts. The number of the accessory spur gear 311 is at least two. One accessory spur gear 311 sleeves the third rotating rod 302 with the first cam 306, and the other accessory spur gear 311 sleeves the fixed rod 303 adjacent to one accessory spur gear 311 and is respectively meshed with the transmission gear set 200 and the accessory spur gear 311 located on the fixed rod 303.

Therefore, when the transmission gear set 200 rotates to drive the accessory spur gear 311 to rotate, the third rotating rod 302 can rotate and drive the first cam 306 to rotate, so that the semicircular arc connecting rod is pulled forward by the force arm connecting rod 301. During the movement, each semicircular arc connecting rod can be contracted, arched and be pulled and expanded, thus realizing walking state of a caterpillar.

Figure 48:
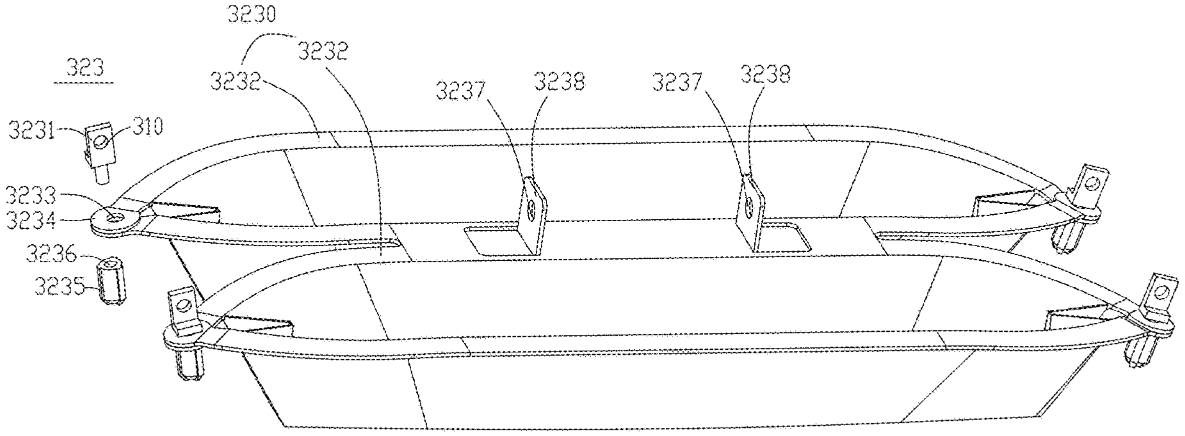
FIG. 48 is a schematic diagram of a hull in the present disclosure.

In one embodiment, referring to FIG. 48, the assembly component 3 also includes a hull 323. Two first lugs 3238 arranged at intervals are formed on the hull 323. A fourth assembly hole 3237 is formed in the first lug 3238. The number of the fixed plates 312 is two, and the two fixed plates 312 are respectively fixed on the front and rear side walls of the gear box 2. The first lug 3238 is connected to the fixed plate 312 after passing through the fourth assembly hole 3237 through a bolt. Specifically, the first lug 328 can be fixed with the gear box 2 through the bolt. Therefore, the assembly of the hull 323 and the gear box 2 is realized.

In the above embodiment, the hull 323 includes a foldable plastic sheet 3230, a first plug connector 3231 and a cap body 3235 with a third plugging groove 3236, and the first lug 3238 is foldably connected to the hull 323. The plastic sheet 3230 includes two connected first sheets 3232, and the first lug 3238 is located at the position where the two first sheets 3232 are connected. Both ends of the first sheet 3232 are provided with two second lugs 3234 at intervals. A fifth assembly hole 3233 is formed in the second lug 3234. The first plug connector 3231 is arranged in the third plugging groove 3236 after passing through the fifth assembly holes 3233 in the two lugs at one end of the first sheet 3232. Thus, the sheet-like plastic sheet 3230 can be folded to form a catamaran hull 323 so as to effectively reduce the overall volume of the assembly robot toy in the embodiment and facilitate transportation. Certainly, in other embodiments, the hull 323 may also be a complete body without being folded.

In one embodiment, the assembly robot toy may also be a surfing robot 1011 (as shown in FIG. 49), a rowing robot 1012 (as shown in FIG. 50) and the like. When the assembly robot toy is assembled into a surfing robot 1011, parts needed for the surfing robot 1011 and the positional relationship of the parts crawl follows.

The numbers of the gear boxes 2 and the head parts 1 are one, and the head part 1 is arranged on the front side wall of the gear box 2. The number of the hulls 323 is one, and the gear box 2 is fixed to the hull 323. The numbers of the second cams 304, the fixed rods 303, the straight-line connecting rods 322 and the force arm connecting rods 301 are all two. The two second cams 304 are respectively plugged on two transmission rods 21. The two fixed rods 303 are respectively plugged at non-central positions of two second cams 304. The two straight-line connecting rods 322 respectively sleeve two fixed rods 303. The numbers of the arc-shaped connecting rods 316 and the T-shaped connecting rods 307 are four. Both ends of every two arc-shaped connecting rods 316 are connected to form a wave-shaped leg part 3007. One end of each of the two leg parts 3007 is respectively connected to two straight-line connecting rods 322 through bolts. Every two T-shaped connecting rods 307 are oppositely arranged side by side through bolts to form a sole piece 3006. The first sliding hole 3071 and the second sliding hole 3072 on each T-shaped piece are splayed. Both ends of each force arm connecting rod 301 are respectively connected to the other end of the leg part 3007 and one end of the sole piece 3006 through bolts, and the middle position of each force arm connecting rod 301 is rotatably connected to the first plug connector 3231 through bolts. The number of the symmetrical semicircular pieces 308 is six, and every three symmetrical semicircular pieces 308 are matched with the bolts to form a paddling arm 3008. In each paddling arm 3008, one end of each of the three symmetrical semicircular pieces 308 is connected through bolts. The other end of the symmetrical semicircular piece 308 in the middle is arranged on one fixed rod 303 through a bolt. Central positions of the other two symmetrical semicircular pieces 308 are connected through bolts and away from one side of the fixed plate 312.

In this way, the shape of surfing is formed. When the surfing robot 1011 is placed on the water surface and the transmission rod 21 rotates, the second cam 304 can be driven to rotate, and one end of the sole piece 3006 can be driven to swing up and down through the fixed rod 303, the straight-line connecting rod 322, the leg part 3007 and the force arm connecting rod 301, and the fixed rod 303 can rotate to drive the paddling arm 3008 to rotate and realize paddling operation.

In the above-mentioned embodiment, limit discs 231 are arranged on one side, away from the straight gear 233, of the eighth gear 232 and on one side of an accessory spur gear 311, so that the accessory spur gear 311 is meshed and stably meshed with the eighth gear 232.

Here, it should be noted that the assembly robot toy in the embodiment can also be assembled into other shapes by using the assembly component 3, and the user can also make various shapes through other paper materials to be assembled together with the components of the assembly robot toy in the embodiment, so that the practical ability and creativity of children are improved.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. An assembly robot toy, comprising a power supply module, a gear box, a rod piece, and a head part and an assembly component which are detachably arranged on the gear box, wherein the gear box comprises a motor, a first gear and a transmission gear set, the power supply module is electrically connected with the motor and is used for supplying power to the motor, the first gear is arranged on a rotating shaft of the motor, the transmission gear set comprises a second gear meshed with the first gear, the number of teeth of the first gear is less than that of teeth of the second gear, the rod piece is connected with the second gear, and the assembly component is connected with the transmission gear set and/or the rod piece;

the rod piece is configured to rotate through the transmission of the first gear and the transmission gear set during motor driving, and at least part of the assembly component is configured to move and drive the gear box to move when the transmission gear set and/or the rod piece rotate/rotates, wherein the head part is rotatably connected with the gear box, and the head part is located at one of the top, front and back positions of the gear box; and a first rotating base and a second rotating base are arranged between the head part and the gear box, and the first rotating base is rotatably connected with the second rotating base; and the first rotating base is configured to enable the head part to rotate along a central axis of the first rotating base under the action of external force other than driving of the motor, and the second rotating base is configured to enable the head part to rotate along a direction perpendicular to the central axis of the first rotating base under the action of external force other than driving of the motor.

2. The assembly robot toy according to claim 1, wherein the rod piece comprises a first rotating rod and a second rotating rod, and the second gear is arranged on the first rotating rod;

the transmission gear set comprises a third gear arranged on the first rotating rod, a fourth gear and a fifth gear arranged on the second rotating rod, and a sixth gear meshed with the fifth gear; the sixth gear is arranged on the first rotating rod, the fifth gear is connected with the fourth gear, the third gear is meshed with the fourth gear, the fifth gear is meshed with the sixth gear, the sixth gear is meshed with the fifth gear, the sixth gear is connected with the fifth gear, the number of teeth of the third gear is less than that of teeth of the fourth gear, the number of teeth of the fifth gear is less than that of teeth of the sixth gear, the first rotating rod is connected with the assembly component;

the first rotating rod rotates through the transmission of the first gear and the second gear during motor driving, the third gear is driven to rotate when the first rotating rod rotates, the fourth gear is driven to rotate when the third gear rotates, the fifth gear is driven to rotate when the fourth gear rotates, the sixth gear is driven to rotate when the fifth gear rotates, the second rotating rod is driven to rotate when the fifth gear rotates, the assembly component is configured to move when the first rotating rod or the sixth gear rotates.

3. The assembly robot toy according to claim 2, wherein the transmission gear set also comprises a seventh gear and an eighth gear, the seventh gear and the eighth gear are arranged on the first rotating rod, the seventh gear is a spur gear, the eighth gear is a spur gear, first avoidance holes are formed in the gear box at the positions corresponding to the seventh gear and the eighth gear, the seventh gear and the eighth gear are driven to rotate when the first rotating rod rotates, the diameter of the seventh gear is larger than that of the eighth gear, and the assembly component is connected with one or more of the first rotating rod, the seventh gear and the eighth gear.

4. The assembly robot toy according to claim 3, wherein the rod piece also comprises a plurality of transmission rods connected to the assembly component, at least two transmission rods are arranged at both ends of the first rotating rod, the at least two transmission rods connected to the first rotating rod at least partially extend into the gear box, and a second avoidance hole is formed in the gear box at the position corresponding to the at least two transmission rods.

5. The assembly robot toy according to claim 4, wherein the gear box comprises a first shell and a second shell which is detachably connected with the first shell to form a first mounting cavity, a second mounting cavity and the second avoidance hole; and the motor is mounted in the first mounting cavity, the transmission gear set is mounted in the second mounting cavity, and a wiring hole connected with the first mounting cavity is formed in the first shell and/or the second shell.

6. The assembly robot toy according to claim 5, wherein a rotating hole is formed in the second mounting cavity;

the gear set also comprises a second rotating rod with one end arranged in the rotating hole after passing through the fourth gear and the fifth gear, and a limit cap arranged at the other end of the second rotating rod; and the seventh gear is located between the fourth gear and the limit cap.

7. The assembly robot toy according to claim 5, wherein the first shell protrudes on one side opposite to the second shell to form a plurality of first plugging ends, a plurality of first plugging grooves are formed in one side, opposite to the first shell, of the second shell, and the first plugging end is arranged in the first plugging groove; and the gear box also comprises a plurality of reinforcing cover plates, a plurality of first clamping holes are formed in the reinforcing cover plate, and a plurality of first clamping buckles are arranged on both sides of the first shell and the second shell, and the first clamping buckle is clamped with the first clamping hole.

8. The assembly robot toy according to claim 5, wherein the power supply module is arranged on the head part, and the power supply module is a solar panel, the head part comprises a bottom shell, a face shell which is detachably connected with the bottom shell and forms a third mounting cavity and two fourth mounting cavities with the bottom shell, and two conducting springs respectively arranged in the two fourth mounting cavities and welded to the solar panel; and the solar panel is arranged in the third mounting cavity, the two fourth mounting cavities are arranged at intervals and are both connected with the third mounting cavity, a third avoidance hole is formed in the face shell and/or the bottom shell at the position corresponding to the fourth mounting cavity, a display port is formed in the face shell at the position corresponding to the solar panel, the motor is electrically connected with two conducting wires, the tail end of the conducting wire is provided with a conducting plate, and the conducting plate is plugged in the conducting spring.

9. The assembly robot toy according to claim 8, wherein the bottom of one end of the face shell extends downward to form a second plugging end, the bottom of the other end of the face shell extends downward to form a plurality of first stop blocks arranged at intervals, and the first stop block protrudes at the bottom of one side opposite to the second plugging end to form a second stop block;

a second plugging groove with a length larger than the length of the second plugging end is formed in the bottom shell, a front end of the bottom shell is arranged above the second stop block, and the second plugging end is arranged in the second plugging groove; and the head part also comprises a plurality of cover bodies with accommodating grooves, the bottom shell is connected with the face shell to form first joint ends on both sides of the head part, and the first joint ends are arranged in the accommodating grooves.

10. The assembly robot toy according to claim 4, wherein the assembly component comprises a plurality of bolts, fixed plates, connecting plates, third rotating rods, wheels, straight-line connecting rods, symmetrical semicircular sole pieces, U-shaped pieces, force arm connecting rods, arc-shaped connecting rods, T-shaped connecting rods, first cams, second cams, fluctuating gears, accessory spur gear and fixed rods;

any two of the gear box, the fixed plate, the connecting plate, the straight-line connecting rod, the arc-shaped connecting rod, the T-shaped connecting rod, the U-shaped piece, the force arm connecting rod, the symmetrical semicircular piece, the first cam, the second cam and the wheel are both connected through one of the bolt and the fixed rod, the accessory spur gear can be used for being meshed with the transmission gear set, and the accessory spur gear, the wheel, the first cam, the second cam, the fluctuating gear or the wheel can detachably sleeve the third rotating rod or the fixed rod, and the second cam is detachably plugged in the transmission rod.

11. The assembly robot toy according to claim 10, wherein a first sliding hole and a second sliding hole perpendicular to the first sliding hole are formed in the T-shaped connecting rod, and the fluctuating gear is provided with a plurality of arc-shaped teeth arranged around the fluctuating gear; the symmetrical semicircular piece is formed by connecting two semicircular plates in central symmetry, a side wall of the second cam is surrounded by first gear teeth, and the inner side of the arc-shaped connecting rod is provided with second gear teeth meshed with the second cam;

wherein at least one plane is formed on an outer side wall of the third rotating rod.

12. The assembly robot toy according to claim 11, wherein a plurality of annular clamping grooves are formed in the outer side walls of the fixed rod and the third rotating rod at equal intervals, the assembly component also comprises a plurality of fixed sleeves sleeving the fixed rod or the third rotating rod, at least one U-shaped opening is formed in a side wall of the fixed sleeve, and one end of an inner side wall of the fixed sleeve protrudes inward to form a second clamping block matched with the annular clamping groove; and the position of the accessory spur gear on the third rotating rod or the fixed rod is limited by two fixed sleeves respectively sleeving both sides of the accessory spur gear.

13. The assembly robot toy according to claim 12, wherein the cross section of the outer side wall of the third rotating rod is a hexagon, the cross section of an outer side wall of the fixed rod is circular, and the diameter of the fixed rod is equal to the distance between two opposite sides of the hexagon.

14. The assembly robot toy according to claim 13, wherein the shape of the assembly robot toy is a crawling robot;

when the assembly robot toy is a crawling robot, the head part is arranged on the top of the gear box; the number of the fixed plates is two, and the two fixed plates are respectively detachably arranged on the left and right sides of the gear box through bolts; the number of the connecting rods is four, and the four connecting rods are respectively arranged at the front and rear ends of the two fixed plates; the numbers of the first cams and the force arm connecting rods are two, the number of the third rotating rods is two, the number of the fixed rods is at least two, the number of the wheels is four, the number of the arc-shaped connecting rods is eight, both ends of one third rotating rod are connected with the first cam after respectively passing through the front ends of two opposite fixed plates, and both ends of one fixed rod are respectively connected with the rear ends of the two opposite fixed plates; one end of each of every two arc-shaped connecting rods is rotatably connected through a bolt to form a similarly semicircular connecting rod, three-quarters and one-quarter positions of every two similarly semicircular connecting rods are connected through a bolt to form a crawling component, and the opening directions of the two similarly semicircular connecting rods in the crawling component are opposite; both ends of each force arm connecting rod are respectively connected with the first cam and one end of the crawling component through bolts, and both ends of one third rotating rod are connected with the wheels after respectively passing through the other end of the crawling component; the two wheels are respectively connected with the front ends of two opposite connecting plates at the front end of the fixed plate through bolts; the number of the accessory spur gears is at least two, one accessory spur gear sleeves the third rotating rod with the first cam, and the other accessory spur gear sleeves the fixed rod adjacent to one accessory spur gear and is respectively meshed with the transmission gear set and the accessory spur gear located on the fixed rod.

15. The assembly robot toy according to claim 12, wherein the assembly component also comprises a hull, two first lugs arranged at intervals are formed on the hull, and a fourth assembly hole is formed in the first lug; the number of the fixed plates is two, and the two fixed plates are respectively fixed on the front and rear side walls of the gear box; and the first lug is connected to the fixed plate after passing through the fourth assembly hole through a bolt.

16. The assembly robot toy according to claim 15, wherein the hull comprises a foldable plastic sheet, a first plug connector and a cap body with a third plugging groove, and the first lug is foldably connected to the hull; the plastic sheet comprises two connected first sheets, and the first lug is located at the position where the two first sheets are connected; both ends of the first sheet are provided with two second lugs at intervals, a fifth assembly hole is formed in the second lug, and the first plug connector is arranged in the third plugging groove after passing through the fourth assembly holes in the two lugs at one end of the first sheet.

17. The assembly robot toy according to claim 16, wherein the assembly robot toy is a surfing robot, and the head part is arranged on the front side wall of the gear box; the numbers of the second cams, the fixed rods, the straight-line connecting rods and the force arm connecting rods are all two, the two second cams are respectively plugged on two transmission rods, the two fixed rods are respectively plugged at non-central positions of two second cams, and the two straight-line connecting rods respectively sleeve two fixed rods; the numbers of the arc-shaped connecting rods and the T-shaped connecting rods are four, both ends of every two arc-shaped connecting rods are connected to form a wave-shaped leg part, and one end of each of the two leg parts is respectively connected to two straight-line connecting rods through bolts; every two T-shaped connecting rods are oppositely arranged side by side through bolts to form a sole piece, and the first sliding hole and the second sliding hole on each T-shaped piece are splayed; both ends of each force arm connecting rod are respectively connected to the other end of the leg part and one end of the sole piece through bolts, and the middle position of each force arm connecting rod is rotatably connected to the first plug connector through bolts; the number of the symmetrical semicircular pieces is six, and every three symmetrical semicircular pieces are matched with the bolts to form a paddling arm; in each paddling arm, one end of each of the three symmetrical semicircular pieces is connected through bolts, the other end of the symmetrical semicircular piece in the middle is arranged on one fixed rod through a bolt, and the central positions of the other two symmetrical semicircular pieces are connected through bolts and away from one side of the fixed plate.

* * * * *